US011424533B2

(12) United States Patent
Cha et al.

(10) Patent No.: US 11,424,533 B2
(45) Date of Patent: Aug. 23, 2022

(54) METHOD AND APPARATUS FOR CONTROLLING ANTENNA

(71) Applicant: INTELLIAN TECHNOLOGIES, Inc., Pyeongtaek-si (KR)

(72) Inventors: Jong Hwan Cha, Seongnam-si (KR); Kwang Soo Kim, Seongnam-si (KR)

(73) Assignee: INTELLIAN TECHNOLOGIES, INC., Pyeongtaek-si (KR)

( * ) Notice: Subject to any disclaimer, the term of this patent is extended or adjusted under 35 U.S.C. 154(b) by 262 days.

(21) Appl. No.: 16/715,323

(22) Filed: Dec. 16, 2019

(65) Prior Publication Data

US 2021/0066778 A1     Mar. 4, 2021

(30) Foreign Application Priority Data

Sep. 2, 2019   (KR) .................. 10-2019-0108228

(51) Int. Cl.
| | |
|---|---|
| *H01Q 1/12* | (2006.01) |
| *H01Q 3/02* | (2006.01) |
| *H01Q 3/08* | (2006.01) |
| *G01S 3/42* | (2006.01) |

(52) U.S. Cl.
CPC ............ *H01Q 3/02* (2013.01); *G01S 3/42* (2013.01); *H01Q 1/125* (2013.01); *H01Q 3/08* (2013.01)

(58) Field of Classification Search
CPC ...................................... H01Q 1/125
See application file for complete search history.

(56) References Cited

U.S. PATENT DOCUMENTS

| | | | | | |
|---|---|---|---|---|---|
| 5,043,737 | A | * | 8/1991 | Dell-Imagine | ............ G01S 3/42 342/359 |
| 5,166,689 | A | * | 11/1992 | Pankow | ................. G01S 13/86 342/77 |
| 7,239,276 | B1 | * | 7/2007 | Bonanni | ................ H01Q 1/288 342/372 |
| 7,333,064 | B1 | * | 2/2008 | Timothy | ................ H01Q 1/125 343/705 |
| 7,446,721 | B2 | * | 11/2008 | Eom | ......................... G01S 3/56 343/781 CA |
| 9,093,742 | B2 | | 7/2015 | Choiniere et al. | |
| 9,543,646 | B2 | * | 1/2017 | Yoshida | .................... G01S 3/42 |
| 10,234,532 | B2 | * | 3/2019 | Uego | ................... H01Q 1/1257 |

(Continued)

FOREIGN PATENT DOCUMENTS

| | | |
|---|---|---|
| JP | 2009141728 A | 6/2009 |
| JP | 5881898 B2 | 3/2016 |

(Continued)

OTHER PUBLICATIONS

PCT; App. No. PCT/KR2019/012803; International Search Report and Written Opinion dated May 29, 2020.

*Primary Examiner* — Ab Salam Alkassim, Jr.
(74) *Attorney, Agent, or Firm* — Fitch, Even, Tabin & Flannery LLP

(57) ABSTRACT

Disclosed is an antenna control method and apparatus. The antenna control method includes determining an azimuth angle of an antenna based on ephemeris information of a satellite, determining an elevation angle and a cross level of the antenna based on the azimuth angle and controlling the antenna based on the azimuth angle, the elevation angle, and the cross level.

20 Claims, 25 Drawing Sheets

(56) References Cited

U.S. PATENT DOCUMENTS

| | | | |
|---|---|---|---|
| 2006/0077097 A1* | 4/2006 | Dybdal | G01S 3/325 |
| | | | 342/359 |
| 2010/0117903 A1* | 5/2010 | Zheng | H04B 7/0617 |
| | | | 342/373 |
| 2010/0265149 A1 | 10/2010 | Omori et al. | |
| 2012/0001816 A1* | 1/2012 | Blaney | H01Q 1/34 |
| | | | 343/765 |
| 2012/0264450 A1* | 10/2012 | Kangas | G01S 5/0226 |
| | | | 455/456.1 |
| 2015/0018997 A1* | 1/2015 | Kagawa | H01Q 1/42 |
| | | | 700/108 |
| 2015/0059500 A1* | 3/2015 | Conrad | H01Q 1/1242 |
| | | | 74/89.14 |
| 2016/0126626 A1* | 5/2016 | Sakai | H01Q 3/08 |
| | | | 318/569 |
| 2016/0336652 A1* | 11/2016 | Yoshida | H01Q 3/08 |
| 2017/0010341 A1* | 1/2017 | Uego | H01Q 1/1264 |
| 2017/0031013 A1* | 2/2017 | Halbert | G01S 7/414 |
| 2017/0310001 A1* | 10/2017 | Jeon | H01Q 3/02 |
| 2018/0048062 A1* | 2/2018 | Jo | H01Q 19/134 |
| 2018/0375188 A1* | 12/2018 | Patel | H01Q 1/1264 |
| 2020/0168989 A1* | 5/2020 | Fukui | H01Q 19/193 |

FOREIGN PATENT DOCUMENTS

| | | |
|---|---|---|
| KR | 20090054801 A | 6/2009 |
| KR | 101657176 B1 | 9/2016 |
| KR | 101793834 B1 | 11/2017 |

\* cited by examiner

METHOD AND APPARATUS FOR CONTROLLING ANTENNA

CROSS-REFERENCE TO RELATED APPLICATION(S)

This application claims the benefit of Korean Patent Application No. 10-2019-0108228, filed on Sep. 2, 2019, in the Korean Intellectual Property Office, the disclosure of which is incorporated herein by reference.

BACKGROUND

1. Field of the Invention

One or more example embodiments relate to a method and apparatus for controlling an antenna.

2. Description of the Related Art

In astronomy, a keyhole state may be a problem that occurs when an azimuth angle-elevation angle (or elevation angle) type telescope or antenna gimbal system passes through a zenith.

For an antenna to be directed to a satellite, when a platform moves or is affected by disturbance, or a satellite moves, a driving torque of an azimuth angle motor may increase proportionally to a maximum elevation angle of a satellite trajectory.

Thus, the antenna may be difficult to accurately point at the satellite as the elevation angle approaches 90 degrees (°). When the elevation angle reaches 90°, the antenna may not point at the satellite. Such a state may be referred to as a keyhole state.

A typical antenna having a support with a two-axis structure may fail to avoid a keyhole problem occurring when the elevation angle reaches 90°. Although the keyhole problem may be solved by increasing the driving torque of the azimuth angle of the antenna, there is a disadvantage that a high-speed control of the azimuth angle of the antenna is difficult. Such a disadvantage may cause a tracking error, which may lead to a degradation in quality of communication.

SUMMARY

An aspect provides technology for controlling an antenna.

According to an aspect, there is provided a method of controlling an antenna, the method including determining an azimuth angle of an antenna based on ephemeris information of a satellite, determining an elevation angle and a cross level of the antenna based on the azimuth angle, and controlling the antenna based on the azimuth angle, the elevation angle, and the cross level.

The ephemeris information may include at least one of a time-based azimuth angle of the satellite, a time-based elevation angle of the satellite, an azimuth angle obtained when the elevation angle of the satellite has a peak value, the peak value of the elevation angle of the satellite, and a time in which the elevation angle of the satellite has the peak value.

The determining of the azimuth angle may include comparing an angular velocity of an azimuth angle of the satellite to a threshold angular velocity and determining a trajectory of the azimuth angle of the antenna based on a comparison result.

The determining of the trajectory of the azimuth angle of the antenna may include determining the trajectory such that an angular velocity of the azimuth angle of the antenna is less than or equal to the threshold angular velocity.

The determining of the trajectory may include determining the trajectory of the azimuth angle of the antenna to be a threshold trajectory when the angular velocity of the azimuth angle of the satellite is greater than or equal to the threshold angular velocity, or determining the trajectory of the azimuth angle of the antenna to be a trajectory based on the ephemeris information when the angular velocity of the azimuth angle is less than the threshold angular velocity.

The determining the trajectory of the azimuth angle of the antenna to be a trajectory based on the ephemeris information may include determining the trajectory to be a two-axis trajectory including an azimuth angle axis of the antenna and an elevation angle axis of the antenna.

The determining of the elevation angle and the cross level of the antenna may include determining the elevation angle of the antenna based on an azimuth angle of the satellite, an elevation angle of the satellite, the azimuth angle of the antenna, and an oblique angle of the antenna, and determining the cross level of the antenna based on the azimuth angle of the satellite, the elevation angle of the satellite, the azimuth angle of the antenna, and the oblique angle of the antenna.

The determining of the elevation angle and the cross level of the antenna may include determining the elevation angle and the cross level of the antenna using at least one of a Bhaskara approximation and a Taylor series approximation of trigonometric function values based on an azimuth angle of the satellite, an elevation angle of the satellite, the azimuth angle of the antenna, and an oblique angle of the antenna.

The determining of the elevation angle and the cross level of the antenna may further include calibrating an error due to at least one of the Bhaskara approximation and the Taylor series approximation.

The calibrating may include calibrating the error using an offset based on a peak value of an elevation angle of the satellite, an initial value of the elevation angle of the satellite, a peak value of an approximated elevation angle of the antenna, and an initial value of the elevation angle of the antenna.

According to another aspect, there is provided an apparatus for controlling an antenna, the apparatus including a controller configured to determine an azimuth angle of an antenna based on ephemeris information of a satellite, determine an elevation angle and a cross level of the antenna based on the azimuth angle, and control the antenna based on the azimuth angle, the elevation angle, and the cross level The ephemeris information may include at least one of a time-based azimuth angle of the satellite, a time-based elevation angle of the satellite, an azimuth angle obtained when the elevation angle of the satellite has a peak value, the peak value of the elevation angle of the satellite, and a time in which the elevation angle of the satellite has the peak value.

The controller may be configured to compare an angular velocity of an azimuth angle of the satellite to a threshold angular velocity and determine a trajectory of the azimuth angle of the antenna based on a comparison result.

The controller may be configured to determine the trajectory such that an angular velocity of the azimuth angle of the antenna is less than or equal to the threshold angular velocity.

The controller may be configured to determine the trajectory of the azimuth angle of the antenna to be a threshold trajectory when the angular velocity of the azimuth angle of the satellite is greater than or equal to the threshold angular velocity, or determine the trajectory of the azimuth angle of the antenna to be a trajectory based on the ephemeris information when the angular velocity of the azimuth angle is less than the threshold angular velocity.

The controller may be configured to determine the trajectory to be a two-axis trajectory is including an azimuth angle axis of the antenna and an elevation angle axis of the antenna.

The controller may be configured to determine the elevation angle of the antenna based on an azimuth angle of the satellite, an elevation angle of the satellite, the azimuth angle of the antenna, and an oblique angle of the antenna, and determine the cross level of the antenna based on the azimuth angle of the satellite, the elevation angle of the satellite, the azimuth angle of the antenna, and the oblique angle of the antenna.

The controller may be configured to determine the elevation angle and the cross level of the antenna using at least one of a Bhaskara approximation and a Taylor series approximation of trigonometric function values based on an azimuth angle of the satellite, an elevation angle of the satellite, the azimuth angle of the antenna, and an oblique angle of the antenna.

The controller may be configured to calibrate an error due to at least one of the Bhaskara approximation and the Taylor series approximation.

The controller may be configured to calibrate the error using an offset based on a peak value of an elevation angle of the satellite, an initial value of the elevation angle of the satellite, a peak value of an approximated elevation angle of the antenna, and an initial value of the elevation angle of the antenna.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
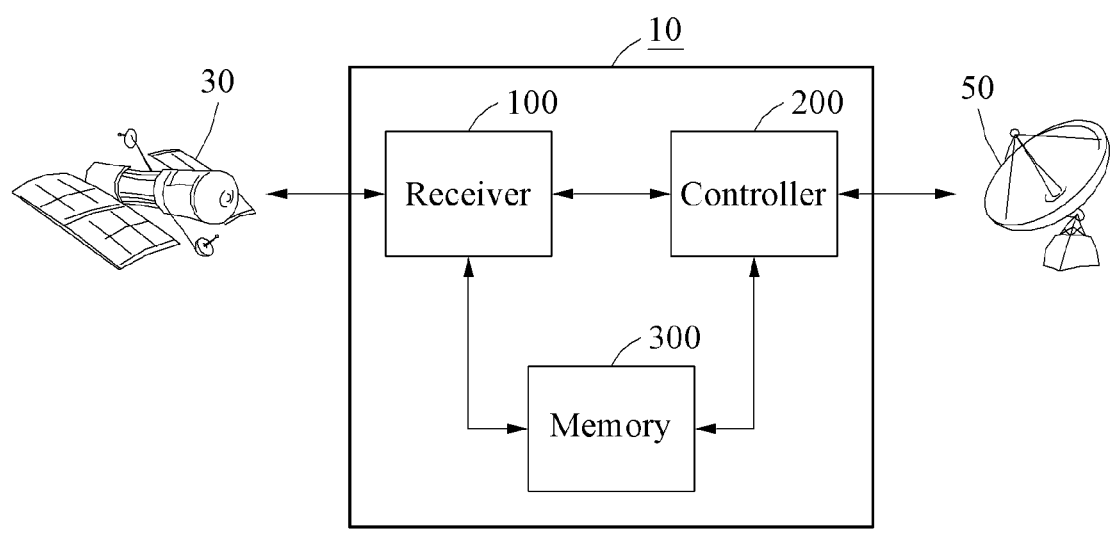
FIG. 1A is a block diagram illustrating an antenna control apparatus according to an example embodiment.

Hereinafter, example embodiments will be described in detail with reference to the accompanying drawings. It should be understood., however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to he construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Figure 1B:
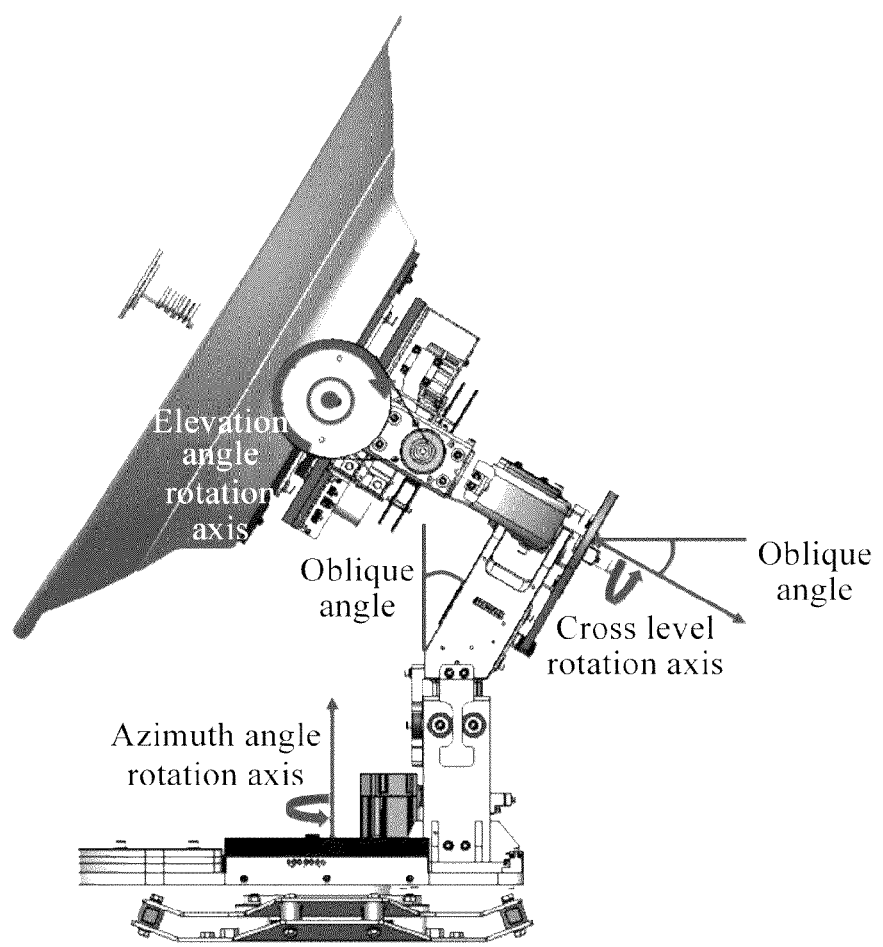
FIG. 1B is a side view illustrating an antenna of FIG. 1A.
Figure 1C:
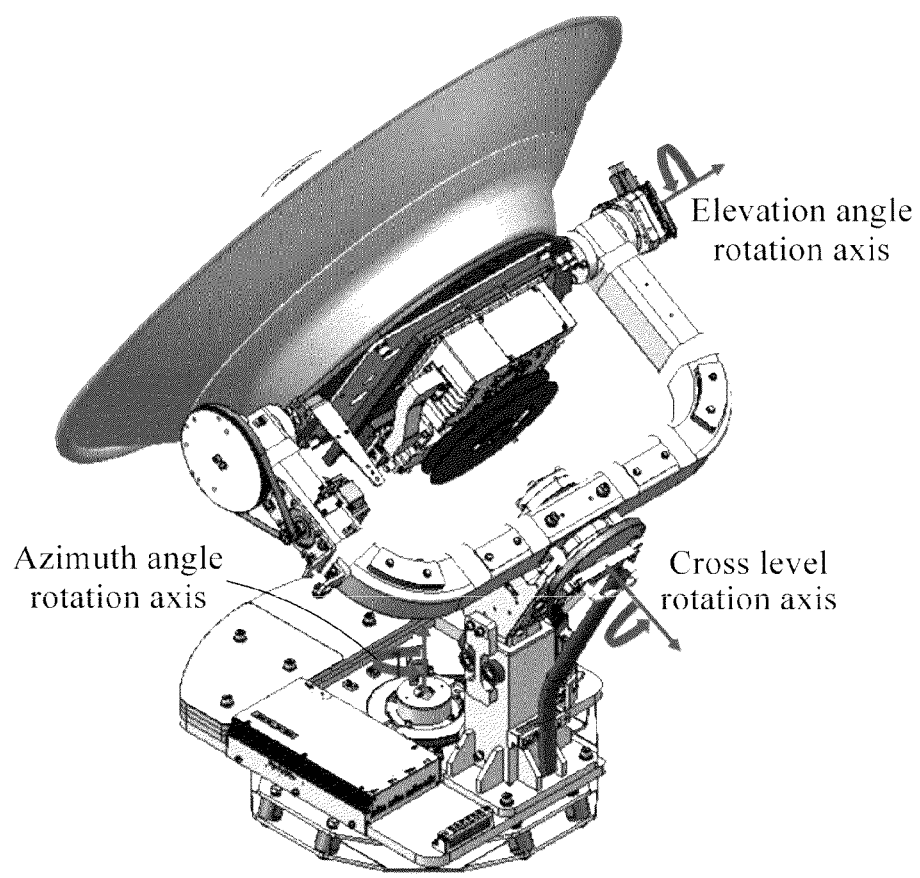
FIG. 1C is a perspective view illustrating an antenna of FIG. 1B.

FIG. 1A is a block diagram illustrating an antenna control apparatus according to an example embodiment, FIG. 113 is a side view illustrating an antenna of FIG. 1A, and FIG. 1C is a perspective view illustrating an antenna of FIG. 1B.

Referring to FIGS. 1A through 1C, an antenna control apparatus 10 may control an antenna 50. The antenna control apparatus 10 may control the antenna 50 based on information received from a satellite 30. The satellite 30 may be an artificial device that is launched using a rocket to orbit around a planet such as the earth and may include an artificial satellite. The antenna 50 may include a satellite antenna. For example, the satellite antenna may include a dish-shaped parabolic antenna designed to receive or transmit information from or to a communication satellite.

The antenna control apparatus 10 may receive ephemeris information from the satellite 30 and control the antenna 50 based on the ephemeris information. The ephemeris information may include information on an orbit of the satellite 30 moving on a time-by-time basis.

The ephemeris information may include at least one of a time-based azimuth angle of the satellite 30, a time-based elevation angle of the satellite 30, an azimuth angle obtained when an elevation angle of the satellite 30 has a peak value, the peak value of the elevation angle of the satellite 30, and a time in which the elevation angle of the satellite 30 has the peak value.

The antenna control apparatus 10 may determine a three-axis trajectory to prevent the antenna 50 from being overdriven in a keyhole situation, thereby controlling the antenna 50 to be stably driven.

In a horizontal coordinate system, the keyhole situation may include a situation in which an angular velocity of the azimuth angle of the antenna is outside a control range as the satellite 30 passes through an azimuth-angle axis of the antenna, a zenith, or a periphery of the zenith, or a situation in which the antenna is difficult to point accurately at the satellite 30 as an elevation angle of the antenna approaches 90 degrees (°) and the antenna does not point at the satellite when the elevation angle of the antenna reaches 90°.

Although FIG. 1A illustrates the antenna control apparatus 10 separate from an antenna, the antenna control apparatus 10 may also he embodied in the antenna 50 as necessary. Also, the antenna control apparatus 10 may be implemented as, for example, an Internet of things (IoT) device, a machine-type communication device, or a portable electronic device.

The portable electronic device may be implemented as, for example, a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, and a smart device. The smart device may be implemented as, for example, a smart watch or a smart band.

The antenna control apparatus 10 may include a receiver 100 and a controller 200. The antenna control apparatus 10 may further include a memory 300.

The receiver 100 may receive the ephemeris information from the satellite 30. Also, the ephemeris information may be stored in the memory 300 in advance. Although FIG. 1A illustrates that the receiver 100 receives the ephemeris information from the satellite 30 as an example, the receiver may receive the ephemeris information from a satellite control system, or another antenna and another antenna control apparatus.

As described above, the ephemeris information may include information on an orbit on which the satellite 30 moves on a time-by-time basis.

The receiver 100 may output the received ephemeris information to the controller 200. Also, the receiver 100 may store the received ephemeris information in the memory 300.

The controller 200 may include a single processor or a plurality of processors. The controller 200 may process the ephemeris information using a processor, thereby controlling an antenna.

The processor may process data received by the receiver 100 and data stored in the memory 300. The processor may process the data stored in the memory 300. The processor may execute computer-readable codes (for example, software) stored in the memory 300 and instructions caused by the processors.

A "processor" may be a data processing device implemented as a hardware including circuitry having a physical structure for performing desired operations. The desired operations may include, for example, codes or instructions contained in a program.

The data processing device implemented as the hardware may include, for example, a microprocessor, a central processing unit, a processor core, a multi-core processor, a multiprocessor, an application-specific integrated circuit (ASIC), and a field programmable gate array (FPGA).

The controller 200 may generate a control signal for controlling the antenna 50. The controller 200 may control the antenna 50 based on the generated control signal.

The controller 200 may determine an azimuth angle of the antenna 50 based on the ephemeris information of the satellite 30. The azimuth angle of the antenna 50 may include an azimuth angle for a position directed by a reflector of the antenna 50.

An azimuth angle may refer to an angle measured clockwise from a reference point (north point or south point) to an intersection point between a horizontal line and a vertical line lowered from a position of the satellite 30 (or an object to be positioned) to the horizontal line in the horizontal coordinate system.

The controller 200 may compare an angular velocity of the azimuth angle of the satellite 30 to a threshold angular velocity. The threshold angular velocity may be a value determined based on a mechanical specification of the antenna 50, and will be further described with reference to FIGS. 3A and 3B.

The controller 200 may determine a trajectory of the azimuth angle of the antenna 50 based on a comparison result. The comparison result may include a case in which the angular velocity of the azimuth angle of the satellite 30 is greater than or equal to the threshold angular velocity and/or a case in which the angular velocity of the azimuth angle of the satellite 30 is less than the threshold angular velocity.

The trajectory of the azimuth angle may include a time-based angle trajectory of the azimuth angle to which the antenna 50 is directed.

The controller 200 may determine the trajectory such that an angular velocity of the azimuth angle of the antenna 50 is less than or equal to the threshold angular velocity. Through this, the controller 200 may stably control a movement of the antenna 50 while reducing a load of the antenna 50.

When the angular velocity of the azimuth angle of the satellite 30 is greater than or equal to the threshold angular velocity, the controller 200 may determine a trajectory of the azimuth angle of the antenna 50 to be a threshold trajectory. The threshold trajectory may include a trajectory having an angular velocity of a predetermined range such that the antenna 50 is stably operated.

Also, when the angular velocity of the azimuth angle of the satellite 30 is less than the threshold angular velocity, the controller 200 may determine the trajectory of the azimuth angle of the antenna 50 to be a trajectory based on the ephemeris information. The trajectory based on the ephemeris information may be the same as the trajectory of the satellite 30.

When the angular velocity of the azimuth angle of the satellite 30 is less than the threshold angular velocity, the controller 200 may determine the trajectory to be a two-axis trajectory including an azimuth angle axis of the antenna 50 and an elevation angle axis of the antenna 50.

The controller 200 may determine an elevation angle and a cross level of the antenna based on the determined azimuth angle of the antenna 50. The elevation angle and the cross level of the antenna 50 may include an elevation angle and a cross level with respect to a position to which a reflector of the antenna 50 is directed.

An elevation angle may refer to an angle vertically measured from a horizontal line to the satellite 30 (or an object to be positioned).

As described in the examples of FIGS. 1B and 1C, the cross level may refer to a rotation angle obtained when the reflector of the antenna 50 rotates to face upward or downward based on a Y axis, or when the reflector of the antenna 50 rotates leftward (in a counterclockwise direction based on a center of a rear side of the reflector) or rightward (in a clockwise direction based on the center of the rear side of the reflector) about an X axis.

In other words, the cross level may refer to an angle rotated such that a front side portion of the reflector of the antenna 50 faces upward or downward based on the Y axis.

Also, the cross level may rotate the reflector of the antenna 50 leftward (in the counterclockwise direction) or rightward (in the clockwise direction) based on the X axis. As such, the cross level gray refer to a clockwise or counterclockwise rotation angle of the reflector of the antenna 50.

For example, when a hull equipped with the antenna 50 sails in an equatorial region (that is, sails along the equator), the target satellite 30 may be positioned vertically above the hull. In this example, the front side portion of the reflector of the antenna 50 may be rotated to face upward or downward, or rotated leftward (in the counterclockwise direction) or rightward (in the clockwise direction) so as to track the target satellite 30.

The front side portion of the reflector of the antenna 50 may face upward or downward by a cross level axis and rotate leftward (in the counterclockwise direction) or rightward (in the clockwise direction) while facing upward or downward, Which may increase a tracking speed of tracking the target satellite 30 or enlarge a rotation range or a movable range of the reflector of the antenna 50.

The controller 200 may determine the elevation angle of the antenna 50 based on the azimuth angle of the satellite 30, the elevation angle of the satellite 30, the azimuth angle of the antenna 50, and an oblique angle of the antenna 50 The oblique angle of the antenna 50 may be a constant value determined by the mechanical specification of the antenna.

The oblique angle of FIG. 113 may be an angle for securing a durability in consideration of a center of gravity and a moment of inertia of the antenna 50. Depending on examples, the oblique angle of the antenna 50 may exist or may not exist. In a case of the antenna 50 having the oblique angle, an axis of the cross level may be inclined.

The controller 200 may determine the cross level of the antenna 50 based on the azimuth angle of the satellite 30, the elevation angle of the satellite 30, the azimuth angle of the antenna 50, and the oblique angle of the antenna 50.

A process in which the controller 200 determines the elevation angle and the cross level of the antenna 50 will be further described with reference to FIGS. 5A through 7C.

The controller 200 may reduce a load of the processor by reducing an amount of calculation of the elevation angle and the cross level of the antenna 50 through an approximation of a trigonometric function.

The controller 200 may determine the elevation angle of the antenna 50 and the cross level of the antenna 50 using at least one of a Bhaskara approximation and a Taylor series approximation of trigonometric function values based on the azimuth angle of the satellite 30, the elevation angle of the satellite 30, the azimuth angle of the antenna 50, and the oblique angle of the antenna 50.

A process in which the controller 200 determines the elevation angle and the cross level of the antenna 50 through an approximation will be further described with reference to FIGS. 8A through 14.

The controller 200 may calibrate an error due to at least one of the Bhaskara approximation and the Taylor series approximation. The controller 200 may calibrate the error using a peak value of the elevation angle of the satellite 30, an initial value of the elevation angle of the satellite 30, a peak value of the approximated elevation angle of the antenna 50, and an offset based on an initial value of the elevation angle of the antenna 50.

A process in which the controller 200 calibrates an error due to at least one of the Bhaskara approximation and the Taylor series approximation will be further described with reference to FIGS. 8A through 14.

The controller 200 may control the antenna 50 based on the determined azimuth angle of the antenna 50 and the determined elevation angle and cross level of the antenna 50.

Hereinafter an overall operation of the antenna control apparatus 10 will be described with reference to FIG. 2.

Figure 2:
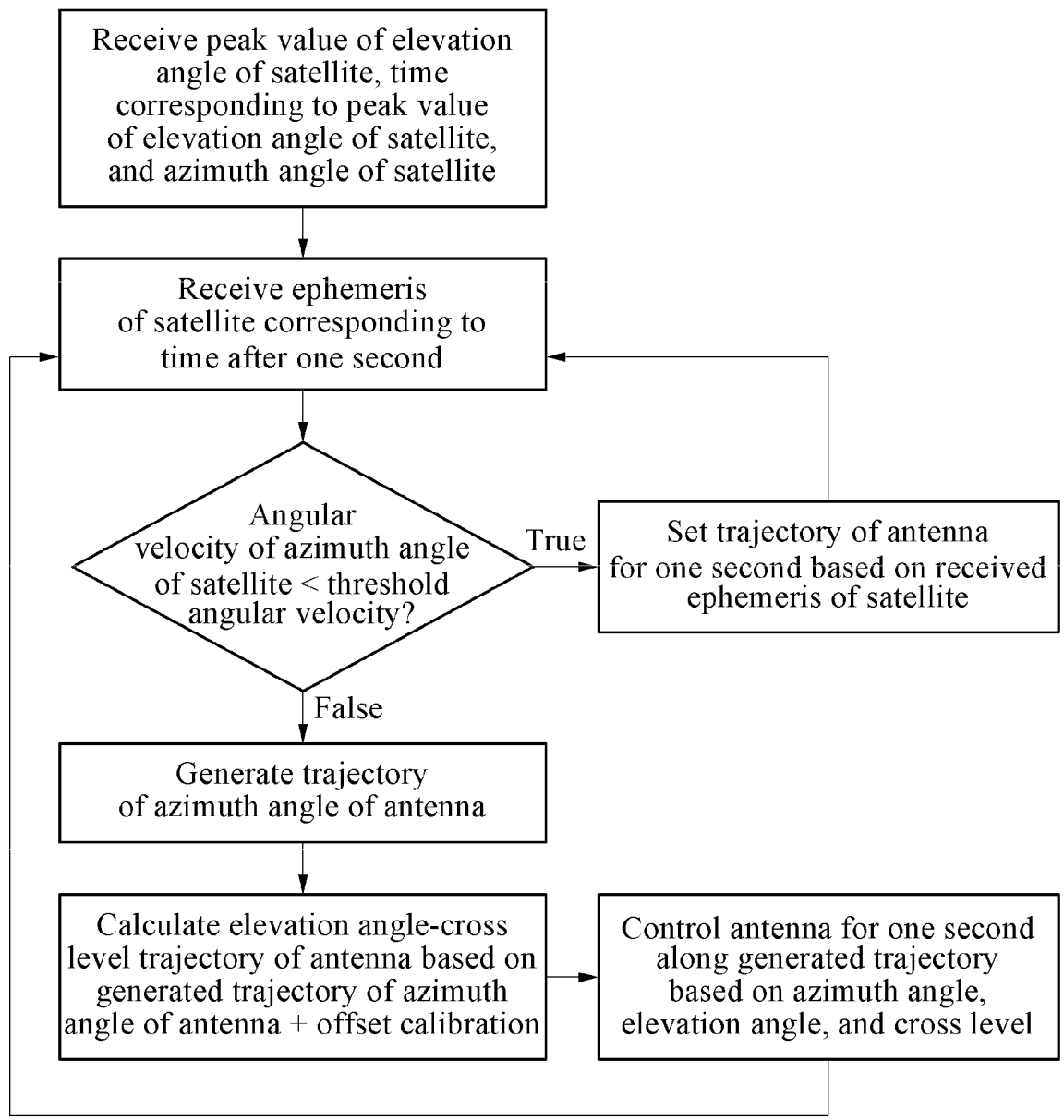
FIG. 2 illustrates an operation of the antenna control apparatus of FIG. 1A.

FIG. 2 illustrates an operation of the antenna control apparatus of FIG. 1A. Referring to FIG. 2, the antenna control apparatus 10 may receive ephemeris information of the satellite 30 and determine a trajectory of the antenna 50 based on the received ephemeris information. The antenna control apparatus 10 may control the antenna 50 based on the determined trajectory.

The receiver 100 may receive the ephemeris information of the satellite 30. Specifically, the receiver 100 may receive a peak value of an elevation angle of the satellite 30, a time corresponding to the peak value of the elevation angle of the satellite 30, and an azimuth angle of the satellite 30.

Also, the receiver 100 may receive ephemeris information corresponding to a future time point. For example, the receiver 100 may receive ephemeris information of the satellite 30 corresponding to a point in time after one second.

The controller 200 may determine a trajectory of the antenna 50 based on the received ephemeris information. The controller 200 may compare an angular velocity of the azimuth angle of the satellite 30 to a threshold angular velocity.

As a comparison result, when the angular velocity of the azimuth angle of the satellite 30 is less than the threshold angular velocity, the controller 200 may set a trajectory of the antenna 50 up to the point in time after one second based on the received ephemeris information of the satellite.

As a comparison result, when the angular velocity of the azimuth angle of the satellite 30 is greater than or equal to the threshold angular velocity, the controller 200 may generate a trajectory of the azimuth angle of the antenna 50. In this example, the controller 200 may generate the trajectory of the azimuth angle of the antenna 50 as a threshold trajectory.

The controller 200 may calculate an elevation angle-cross level trajectory of the antenna 50 based on the generated trajectory of the azimuth angle of the antenna 50. In this example, the controller 200 may simplify a calculation through an approximation.

Also, the controller 200 may calibrate an error in the elevation angle and the cross level of the antenna 50 calculated through the approximation. For example, the controller 200 may use an offset to calibrate a calculation error due to the approximation.

The controller 200 may control the antenna 50 based on a generated trajectory. The controller 200 may generate a trajectory corresponding to a predetermined time interval and control the antenna 50 based on the generated trajectory for the predetermined time interval. For example, the controller 200 may control the antenna 50 for one second along the generated trajectory based on the azimuth angle, the elevation angle, and the cross level of the antenna 50.

Hereinafter, the threshold angular velocity and the threshold trajectory will be described with reference to FIGS. 3A through 4B.

Figure 3A:
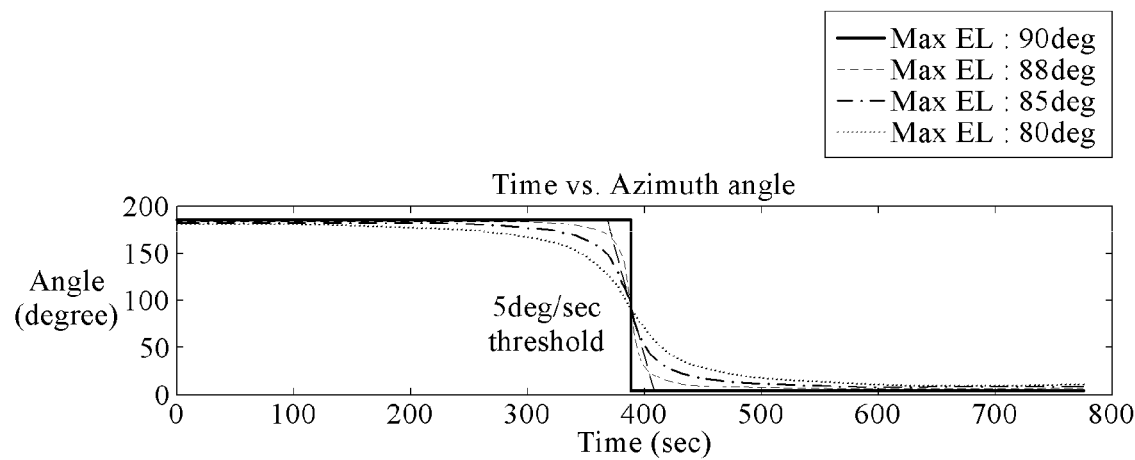
FIG. 3A is a graph representing a time-based angle for explaining a threshold angular velocity of an azimuth angle of a satellite.
Figure 3B:
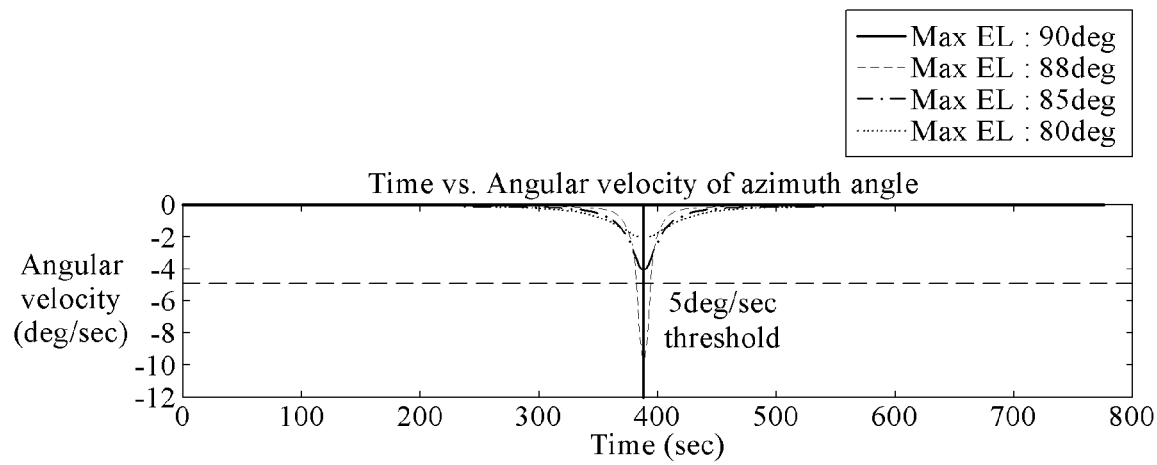
FIG. 3B is a graph representing a time-based angular velocity for explaining a threshold angular velocity of an azimuth angle of a satellite.

FIG. 3A is a graph representing a time-based angle for explaining a threshold angular velocity of an azimuth angle of a satellite, and. FIG. 3B is a graph representing a time-based angular velocity for explaining a threshold angular velocity of an azimuth angle of a satellite.

Figure 4A:
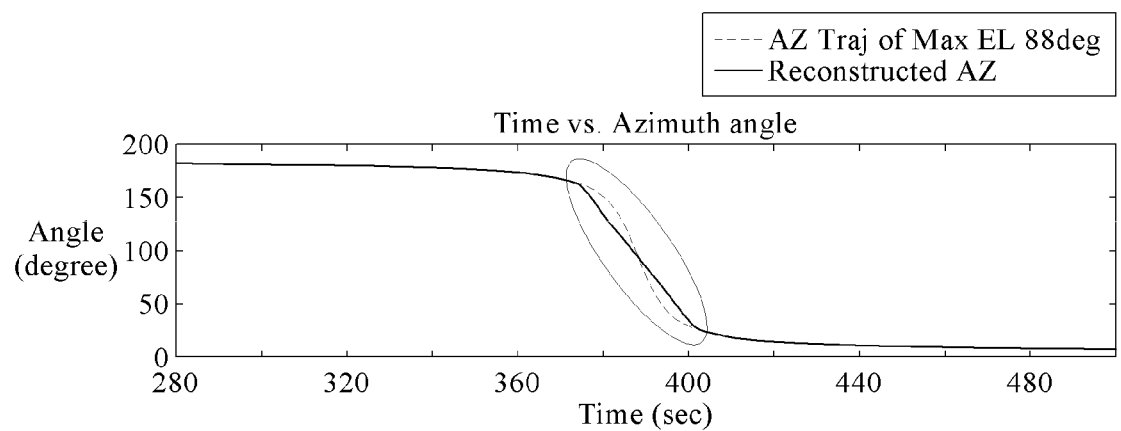
FIG. 4A is a graph representing a time-based angle for explaining a threshold angular velocity.
Figure 4B:
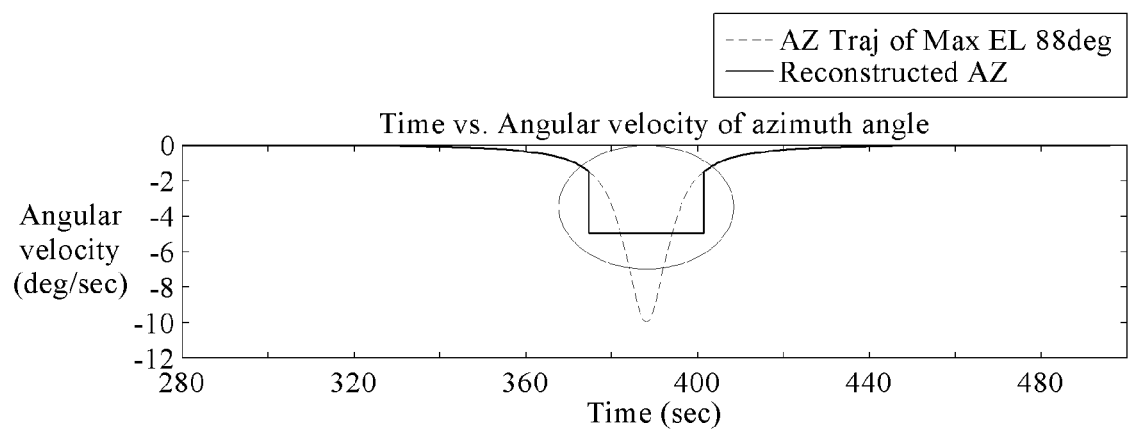
FIG. 4B is a graph representing a time-based angular velocity for explaining a threshold angular velocity.

FIG. 4A is a graph representing a time-based angle for explaining a threshold angular velocity, and FIG. 4B is a graph representing a time-based angular velocity for explaining a threshold angular velocity.

Referring to FIGS. 3A and 3B, the antenna 50 may include a driver (not shown). The driver may include a single motor or a plurality of motors.

The antenna 50 may have a plurality of driving axes. For example, a driving axis of the antenna 50 may include an azimuth-angle axis, an elevation-angle axis, and a cross-level axis.

The controller 200 may control a motor moving the driving axis of the antenna 50 to change an azimuth angle, an elevation angle, and a cross level. The controller 200 may set a threshold angular velocity and a threshold trajectory to prevent a load of the motor driving the antenna.

In a keyhole situation, since an azimuth angle of the antenna 50 is to he drastically changed, a large amount of load may he generated in the motor of the driver rotating the azimuth-angle axis. To prevent an unacceptable load from being generated in the driver, the controller 200 may limit a trajectory and an angular velocity of the azimuth angle of the antenna 50.

The controller 200 may set the threshold angular velocity in advance by reflecting a tracking environment and a performance of the antenna 50.

For example, the controller 200 may manage the angular velocity of the azimuth angle of the antenna 50 to be less than or equal to the threshold angular velocity. When an angular velocity greater than or equal to the threshold angular velocity is required, the controller 200 may control the antenna 50 through a driving based on a three-axis trajectory, thereby preventing a load generation in the driver.

Also, the controller 200 may control the antenna 50 using a two-axis trajectory including an azimuth angle and an elevation angle in an environment in Which an angular velocity for driving is less than or equal to the threshold angular velocity.

FIG. 3A illustrates a time-based azimuth angle changing in a case in which a maximum value of an elevation angle of the antenna 50 is 90°, 88°, 85°, and 80°. FIG. 3B illustrates an angular velocity of an azimuth angle of the antenna 50 in a case in which a maximum value of the elevation angle of the antenna 50 is 90°, 88°, 85°, and 80°.

In the example of FIG. 3A, a threshold angular velocity may be 5 degrees per second (deg/sec). In this instance, in a case in which a maximum azimuth angle is 90° and in a case in which a maximum azimuth angle is 88°, an interval in which an angular velocity exceeds the threshold angular velocity may exist.

The controller 200 may calculate the angular velocity of the azimuth angle of the antenna 50 based on a gradient between an azimuth angle obtained when the elevation angle of the satellite 30 has the peak value and an azimuth angle of the satellite 30 of a future time point included in the received ephemeris information. The controller 200 may compare the calculated angular velocity to the threshold angular velocity.

For example, when ephemeris information corresponding to a point in time after one second is received, the angular velocity of the azimuth angle of the antenna 50 may be compared to the threshold angular velocity as shown in Equation 1 below.

$$\left| \frac{\alpha_p - \alpha_{t+1}}{t_p - (t+1)} \right| < |\dot{\theta}_{thr}| \qquad \text{[Equation 1]}$$

In Equation 1, $\alpha_p$ denotes an azimuth angle obtained when the elevation angle of the satellite 30 has the peak value, $t_p$ denotes a time in which the elevation angle of the satellite 30 is the peak value, and $\alpha_{t+1}$ denotes an azimuth angle of the satellite 30 obtained after one second. $\dot{\theta}_{thr}$ denotes a threshold angular velocity for an azimuth angle and t denotes a current time.

The controller 200 may determine a sign of the threshold angular velocity positively or negatively based on a direction of the trajectory of the azimuth angle of the satellite 30. For example, the controller 200 may set a sign of the threshold angular velocity based on the direction of the trajectory of the azimuth angle of the satellite 30 as shown in Equations 2 through 5.

If $0<\alpha_{t+1}-\alpha_p<180$ and $t+1<t_p$, $$\dot{\theta}_{thr}<0 \qquad \text{[Equation 2]}$$

If $0<\alpha_{t+1}-\alpha_p<-180$ and $t+1<t_p$, $$\dot{\theta}_{thr}>0 \qquad \text{[Equation 3]}$$

If $0<\alpha_{t+1}-\alpha_p<180$ and $t+1>t_p$, $$\dot{\theta}_{thr}>0 \qquad \text{[Equation 4]}$$

If $0<\alpha_{t+1}-\alpha_p>-180$ and $t+1<t_p$, $$\dot{\theta}_{thr}<0 \qquad \text{[Equation 5]}$$

When the trajectory of the azimuth angle of the satellite 30 exceeds true north (zero degrees), the controller 200 may adjust a range of the azimuth angle, for example, $0 \leq \alpha < 360$. For example, the controller 200 may adjust the azimuth angle of the satellite 30 as shown in Equations 6 through 9.

If $\alpha_{t+1}-\alpha_p<180$ and $t+1<t_p$, $$\alpha_{t+1,mod}=\alpha_{t+1}-360 \text{ and } \dot{\theta}_{thr}>0 \qquad \text{[Equation 6]}$$

If $\alpha_{t+1}-\alpha_p<180$ and $t+1<t_p$, $$\alpha_{t+1,mod}=\alpha_{t+1}-360 \text{ and } \dot{\theta}_{thr}>0 \qquad \text{[Equation 7]}$$

If $\alpha_{t+1}-\alpha_p<180$ and $t+1<t_p$, $$\alpha_{t+1,mod}=\alpha_{t+1}-360 \text{ and } \dot{\theta}_{thr}>0 \qquad \text{[Equation 8]}$$

If $\alpha_{t+1}-\alpha_p<-180$ and $t+1<t_p$, $$\alpha_{t+1,mod}=\alpha_{t+1}+360 \text{ and } \dot{\theta}_{thr}>0 \qquad \text{[Equation 9]}$$

Here, $\alpha_{t+1,mod}$ denotes an azimuth angle of the satellite 30 obtained when one second elapsed after an angle value is adjusted.

When the angular velocity of the satellite 30 calculated according to Equation 1 is greater than or equal to the threshold angular velocity, the controller 200 may determine the angular velocity of the antenna 50 to be the threshold angular velocity. For example, the controller 200 may determine the angular velocity of the antenna 50 as shown in Equation 10.

$$\theta_{t+1}=\dot{\theta}_{thr}((t+1)-t_p)+\alpha_p \qquad \text{[Equation 10]}$$

In Equation 10, $\theta_{t+1}$ denotes an azimuth angle of the antenna 50 obtained after one second.

FIG. 4A illustrates a time-based azimuth angle of the antenna 50 obtained when a maximum value of the elevation angle of the satellite 30 is 88° and FIG. 4B illustrates an angular velocity of an azimuth angle obtained when a maximum value of the elevation angle of the satellite 30 is 88°.

In the examples of FIGS. 4A and 4B, because an angular velocity indicated by a dashed line exceeds the threshold angular velocity, the controller 200 may adjust the angular velocity of the antenna 50 to be the threshold angular velocity according to Equation 10 as indicated by a solid line.

Hereinafter, a process of determining the elevation angle and the cross level of the antenna 50 will be described with reference to FIGS. 5A through 7C.

Figure 5A:
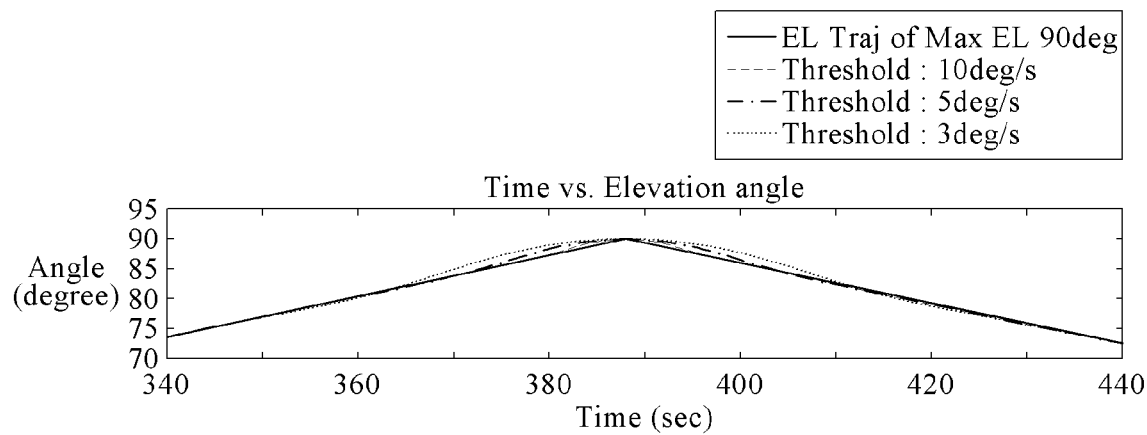
FIG. 5A is a graph representing an elevation angle of an antenna on a time-by-time basis in a keyhole situation.
Figure 5B:
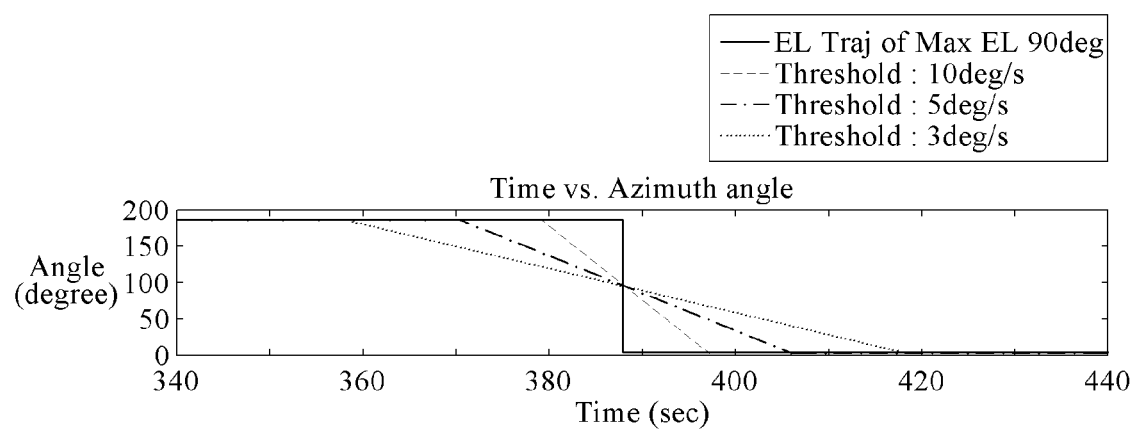
FIG. 5B is a graph representing an azimuth angle of an antenna on a time-by-time basis in a keyhole situation.
Figure 5C:
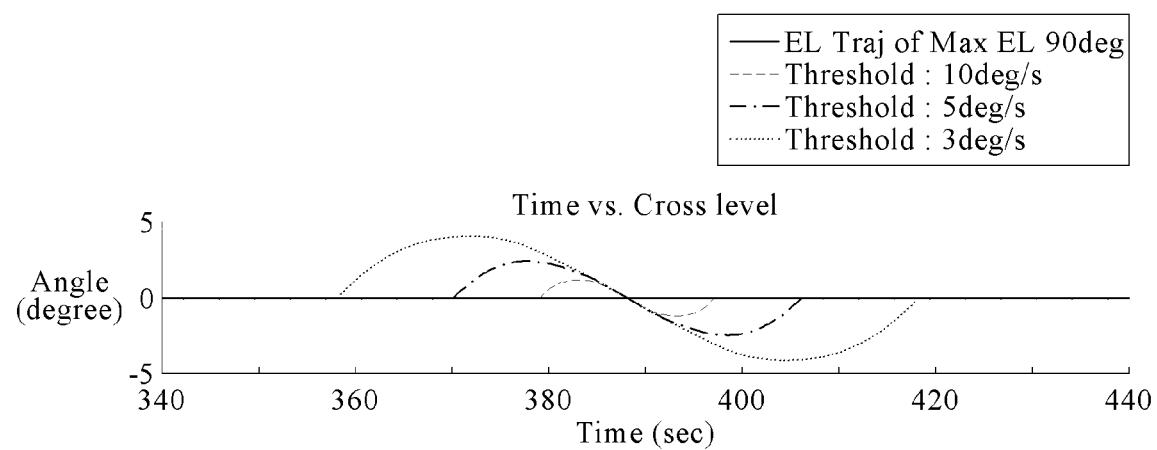
FIG. 5C is a graph representing a cross level of an antenna on a time-by-time basis in a keyhole situation.

FIG. 5A is a graph representing an elevation angle of an antenna on a time-by-time basis in a keyhole situation, FIG. 5B is a graph representing an azimuth angle of an antenna on a time-by-time basis in a keyhole situation, and FIG. 5C is a graph representing a cross level of an antenna on a time-by-time basis in a keyhole situation.

Figure 6A:
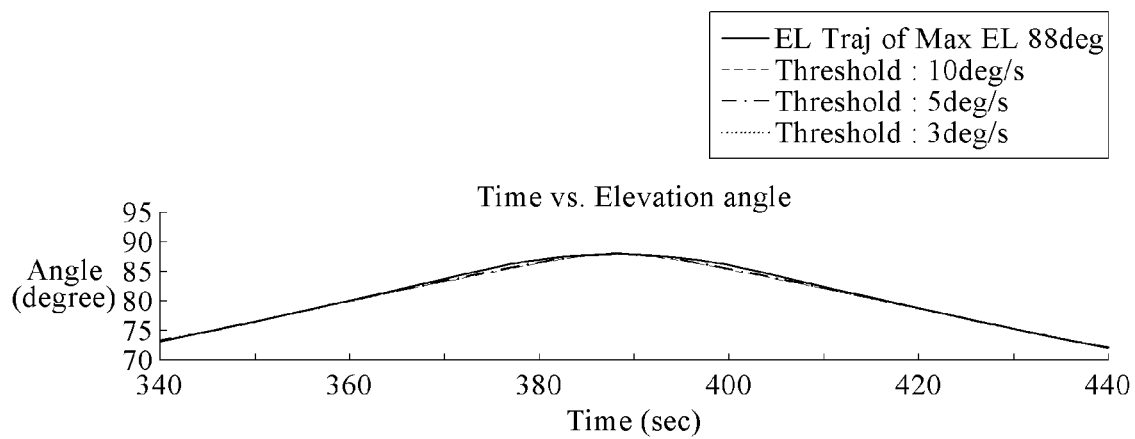
FIG. 6A is a graph representing an elevation angle of an antenna on a time-by-time basis in a case in which a peak value of an elevation angle of a satellite is 88 degrees (°)
Figure 6B:
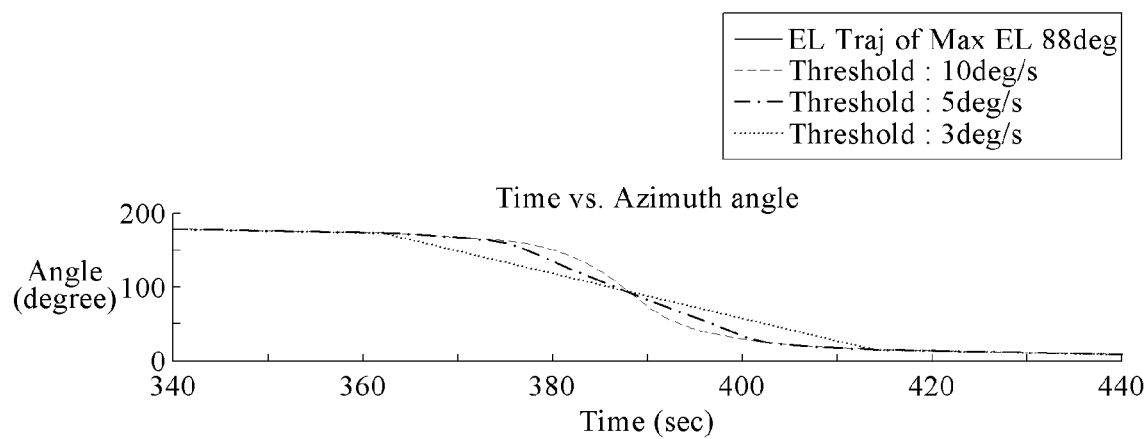
FIG. 6B is a graph representing an azimuth angle of an antenna on a time-by-time basis in a case in which a peak value of an elevation angle of a satellite is 88°.
Figure 6C:
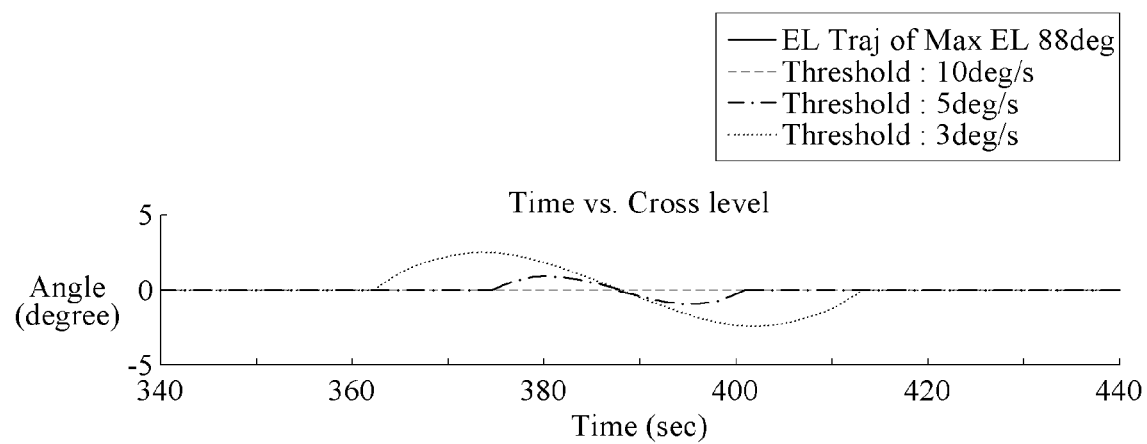
FIG. 6C is a graph representing a cross level of an antenna on a time-by-time basis in a case in which a peak value of an elevation angle of a satellite is 88°.

FIG. 6A is a graph representing an elevation angle of an antenna on a time-by-time basis when a peak value of an elevation angle of a satellite is 88°, FIG. 6B is a graph representing an azimuth angle of an antenna on a time-by-time basis when a peak value of an elevation angle of a satellite is 88°. and FIG. 6C is a graph representing a cross level of an antenna on a time-by-time basis when a peak value of an elevation angle of a satellite is 88°.

Figure 7A:
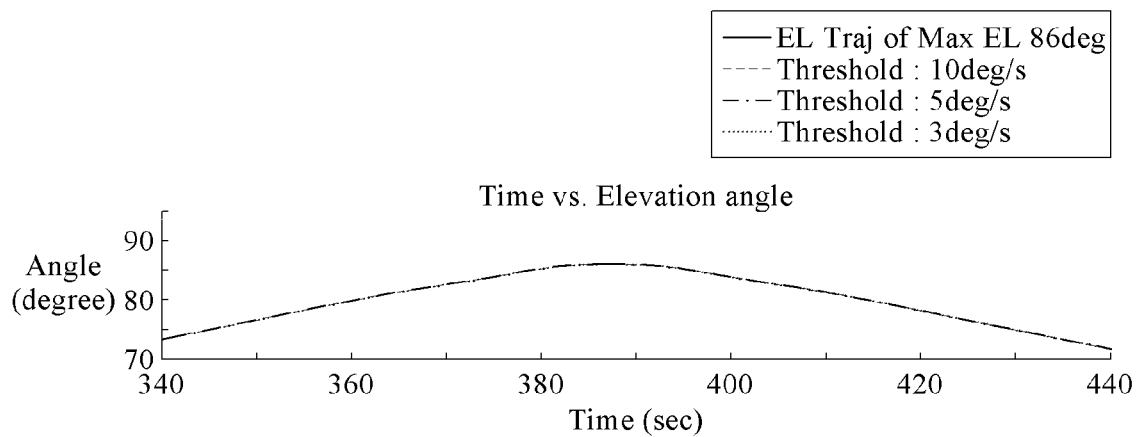
FIG. 7A is a graph representing an elevation angle of an antenna on a time-by-time basis in a case in which a peak value of an elevation angle of a satellite is 86°.
Figure 7B:
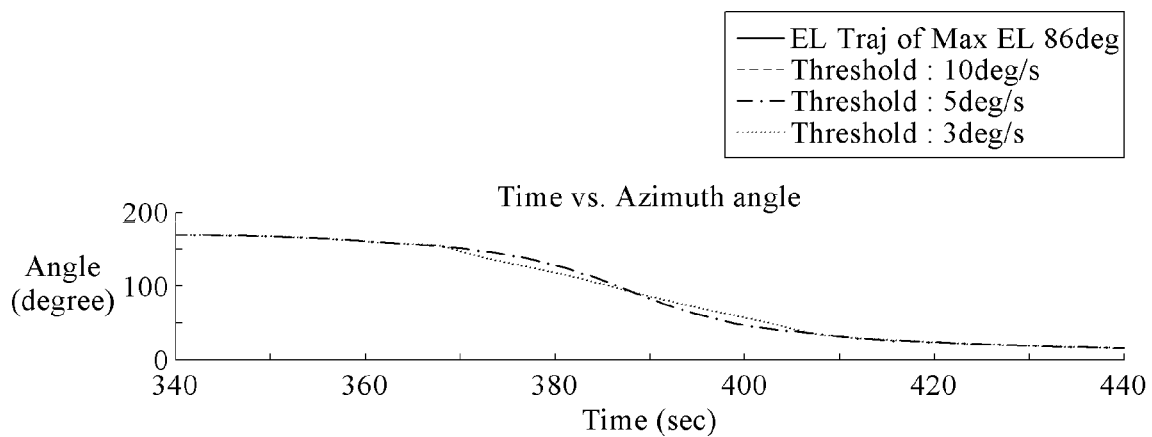
FIG. 7B is a graph representing an azimuth angle of an antenna on a time-by-time basis in a case in which a peak value of an elevation angle of a satellite is 86°.
Figure 7C:
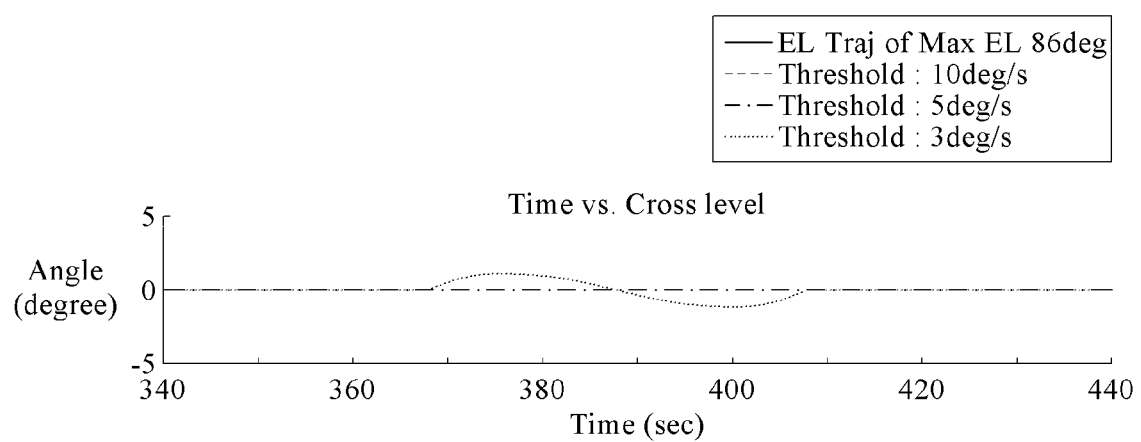
FIG. 7C is a graph representing a cross level of an antenna on a time-by-time basis in a case in which a peak value of an elevation angle of a satellite is 86°.

FIG. 7A is a graph representing an elevation angle of an antenna on a time-by-time basis in a case in which a peak value of an elevation angle of a satellite is 86°, FIG. 7B is a graph representing an azimuth angle of an antenna on a time-by-time basis in a case in which a peak value of an elevation angle of a satellite is 86°, and FIG. 7C is a graph representing a cross level of an antenna on a time-by-time basis in a case in which a peak value of an elevation angle of a satellite is 86°.

Referring to FIGS. 5A through 7C, the controller 200 may determine an elevation angle and a cross level of the antenna 50 based on the determined azimuth angle of the antenna 50. The controller 200 may determine a relationship between a trajectory of the satellite 30 and a trajectory of the antenna using Euler rotation.

The controller 200 may determine the elevation angle of the antenna 50 and the cross level of the antenna using Equation 11.

$$R_{antCL,\gamma} R_{antEL,\varphi} \begin{bmatrix} 0 \\ 1 \\ 0 \end{bmatrix} = R_{obj,\varepsilon}^T R_{antAZ,\theta}^T R_{satAZ,\alpha} R_{satEL,\beta} \begin{bmatrix} 0 \\ 1 \\ 0 \end{bmatrix} \quad \text{[Equation 11]}$$

In Equation 1 $R_{antCL,\gamma}$ denotes a rotation matrix corresponding to the cross level of the antenna 50 and $R_{antEL,\varphi}$ denotes a rotation matrix corresponding to the elevation angle of the antenna 50. $R_{obq,\varepsilon}^T$ denotes a transposed matrix (or an inverse matrix) of a rotation matrix corresponding to an oblique angle of the antenna 50 and $R_{antAZ,\theta}^T$ denotes a transposed matrix (or an inverse matrix) of a rotation matrix corresponding to the azimuth angle of the antenna 50. $R_{satAZ,\alpha}$ denotes a rotation matrix corresponding to an azimuth angle of the satellite 30 and $R_{satEL,\beta}$ denotes a rotation matrix corresponding to an elevation angle of the satellite. In terms of an Euler rotation matrix, a transposed matrix may be the same as an inverse matrix.

The rotation matrices used in Equation 11 may be expressed as shown in Equations 12 through 17.

$$R_{antCL,\gamma} = \begin{bmatrix} \cos\gamma & 0 & \sin\gamma \\ 0 & 1 & 0 \\ -\sin\gamma & 0 & \cos\gamma \end{bmatrix} \quad \text{[Equation 12]}$$

$$R_{antEL,\varphi} = \begin{bmatrix} 1 & 0 & 0 \\ 0 & \cos\varphi & -\sin\varphi \\ 0 & \sin\varphi & \cos\varphi \end{bmatrix} \quad \text{[Equation 13]}$$

$$R_{obj,\varepsilon}^T = \begin{bmatrix} 1 & 0 & 0 \\ 0 & \cos\varepsilon & \sin\varepsilon \\ 0 & -\sin\varepsilon & \cos\varepsilon \end{bmatrix} \quad \text{[Equation 14]}$$

$$R_{antAZ,\theta}^T = \begin{bmatrix} \cos\theta & -\sin\theta & 0 \\ \sin\theta & \cos\theta & 0 \\ 0 & 0 & 1 \end{bmatrix} \quad \text{[Equation 15]}$$

$$R_{satAZ,\alpha} = \begin{bmatrix} \cos\alpha & \sin\alpha & 0 \\ -\sin\alpha & \cos\alpha & 0 \\ 0 & 0 & 1 \end{bmatrix} \quad \text{[Equation 16]}$$

$$R_{satEL,\beta} = \begin{bmatrix} 1 & 0 & 0 \\ 0 & \cos\beta & -\sin\beta \\ 0 & \sin\beta & \cos\beta \end{bmatrix} \quad \text{[Equation 17]}$$

A left side and a right side of Equation 11 may be expressed as Equations 18 and 19.

$$R_{antCL,\gamma} R_{antEL,\varphi} \begin{bmatrix} 0 \\ 1 \\ 0 \end{bmatrix} = \begin{bmatrix} \sin\gamma \sin\varphi \\ \cos\varphi \\ \cos\gamma \sin\varphi \end{bmatrix} \quad \text{[Equation 18]}$$

$$R_{obj,\varepsilon}^T R_{antAZ,\theta}^T R_{satAZ,\alpha} R_{satEL,\beta} \begin{bmatrix} 0 \\ 1 \\ 0 \end{bmatrix} = \begin{bmatrix} v_1 \\ v_2 \\ v_3 \end{bmatrix} \quad \text{[Equation 19]}$$

Here, $\varphi$ denotes an elevation angle of the antenna 50 and $\gamma$ denotes a cross level of the antenna 50. and $v_1$, $v_2$, and $v_3$ denote components (or a first vector, a second vector, and a third vector) of a first row, a second row, and a third row. According to Equations 18 and 19, the elevation angle of the antenna 50 and the cross level of the antenna 50 may expressed as Equation 20.

$$\varphi = \begin{cases} -\cos^{-1} v_2 & \text{if } v_3 < 0 \\ \cos^{-1} v_2 & \text{otherwise} \end{cases} \quad \text{[Equation 20]}$$

$$\gamma = \tan^{-1}(v_1/v_3)$$

Also, $v_1$, $v_2$, and $v_3$ of Equation 19 may he expressed as Equation 21.

$$\begin{bmatrix} v_1 \\ v_2 \\ v_3 \end{bmatrix} = \begin{bmatrix} \cos\theta \sin\alpha \cos\beta - \sin\theta \cos\alpha \cos\beta \\ \cos\varepsilon \sin\theta \sin\alpha \cos\beta + \cos\varepsilon \cos\theta \cos\alpha \cos\beta + \sin\varepsilon \sin\beta \\ -\sin\varepsilon \sin\theta \sin\alpha \cos\beta - \sin\varepsilon \cos\theta \cos\alpha \cos\beta + \cos\varepsilon \sin\beta \end{bmatrix} \quad \text{[Equation 21]}$$

The elevation angle and the cross level of the antenna 50 may be calculated using Equations 20 and 21 as shown in Equation 22.

$$\varphi = \begin{cases} -\cos^{-1}(\cos \varepsilon \sin \theta \sin \alpha \cos \beta + \cos \varepsilon \cos \theta \cos \alpha \cos \beta + \sin \varepsilon \sin \beta), & \text{if } v_3 < 0 \\ \cos^{-1}(\cos \varepsilon \sin \theta \sin \alpha \cos \beta + \cos \varepsilon \cos \theta \cos \alpha \cos \beta + \sin \varepsilon \sin \beta), & \text{otherwise} \end{cases}$$ [Equation 22]

$$\gamma = \tan^{-1}\left(\frac{\cos \theta \sin \alpha \cos \beta - \sin \theta \cos \alpha \cos \beta}{-\sin \varepsilon \sin \theta \sin \alpha \sin \beta - \sin \varepsilon \cos \theta \cos \alpha \cos \beta + \cos \varepsilon \sin \beta}\right)$$

Elements of the matrix used in Equations 18 through 22 may vary based on a reference point of an angle. When the elements of the matrix are changed, Equations 18 through 22 may be changed. FIG. 5A illustrates a time-based trajectory of the elevation angle of the antenna 50 determined according to Equation 22 when the threshold angular velocity is 10 deg/sec, 5 deg/sec, and 3 deg/sec in a case in which a maximum elevation angle of the satellite 30 is 90°.

FIG. 5B illustrates a time-based trajectory of the azimuth angle of the antenna 50 when the threshold angular velocity is 10 deg/sec, 5 deg/sec, and 3 deg/sec in a case in which a maximum elevation angle of the satellite 30 is 90°.

FIG. 5C illustrates a time-based trajectory of the cross level of the antenna 50 determined according to Equation 22 when the threshold angular velocity is 10 deg/sec, 5 deg/sec, and 3 deg/sec in a case in which a maximum elevation angle of the satellite 30 is 90°.

The case in which the maximum elevation angle of the satellite 30 is 90° may indicate two-axis driving with no change in cross level. In this case, an angular velocity of an azimuth angle may be infinite at a point in time in which the elevation angle of the antenna 50 is maximized.

FIG. 6A illustrates a time-based trajectory of the elevation angle of the antenna 50 determined according to Equation 22 in a case in which a maximum elevation angle of the satellite 30 is 88° and the threshold angular velocity is 10 deg/sec, 5 deg/sec, and 3 deg/sec.

FIG. 6B illustrates a time-based trajectory of the azimuth angle of the antenna 50 in a case in which a maximum elevation angle of the satellite 30 is 88° and the threshold angular velocity is 10 deg/sec, 5 deg/sec, and 3 deg/sec.

FIG. 6C illustrates a time-based trajectory of the cross level of the antenna 50 determined according to Equation 22 in a case in which a maximum elevation angle of the satellite 30 is 88° and the threshold angular velocity is 10 deg/sec, 5 deg/sec, and 3 deg/sec, FIG. 7A illustrates a time-based trajectory of the elevation angle of the antenna 50 determined according to Equation 22 in a case in which a maximum elevation angle of the satellite 30 is 86° and the threshold angular velocity is 10 deg/sec. 5 deg/sec, and 3 deg/sec.

FIG. 7B illustrates a time-based trajectory of the azimuth angle of the antenna 50 in a case in which a maximum elevation angle of the satellite 30 is 86° and the threshold angular velocity is 10 deg/sec, 5 deg/sec, and 3 deg/sec.

FIG. 7C illustrates a time-based trajectory of the cross level of the antenna 50 determined according to Equation 22 in a case in which a maximum elevation angle of the satellite 30 is 86° and the threshold angular velocity is 10 deg/sec, 5 deg/sec, and 3 deg/sec, Hereinafter, a process in which the controller 200 calculates an elevation angle and a cross level of the antenna 50 through an approximation and calibrates an error due to the approximation will be described in detail with reference to FIGS. 8A through 14.

Figure 8A:
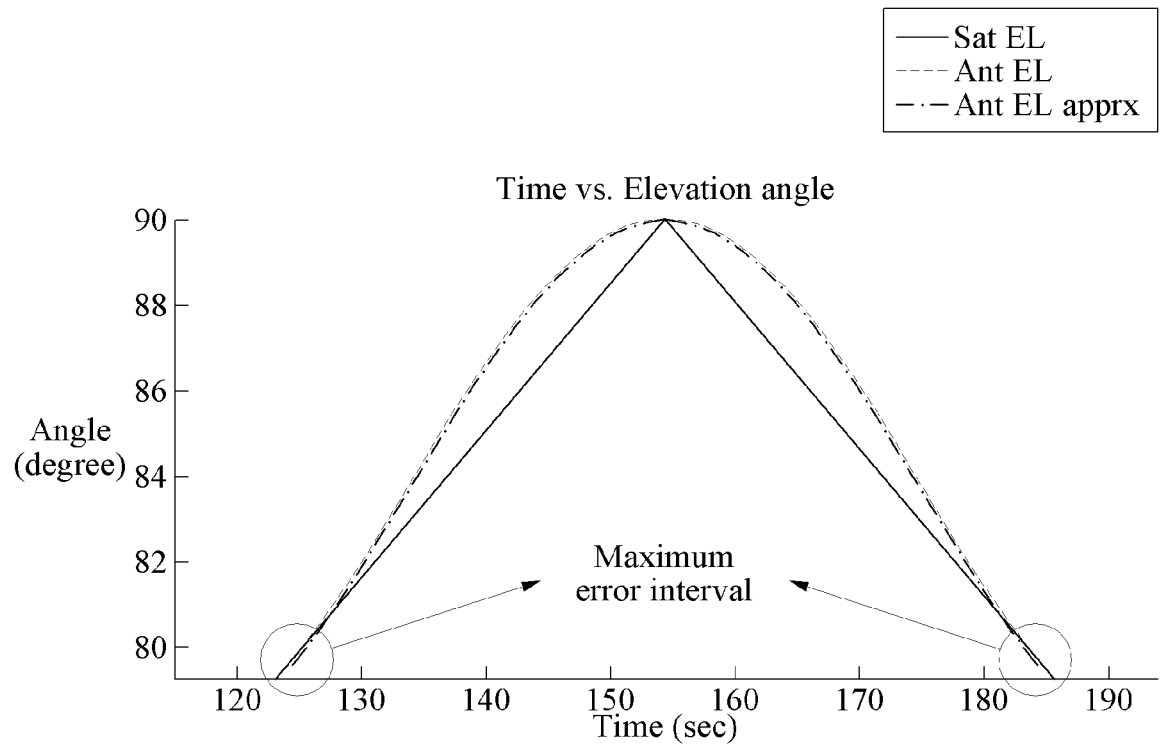
FIG. 8A is a graph representing an elevation angle of an antenna on a time-by-time basis to explain an error in an approximately calculated elevation angle of the antenna.
Figure 8B:
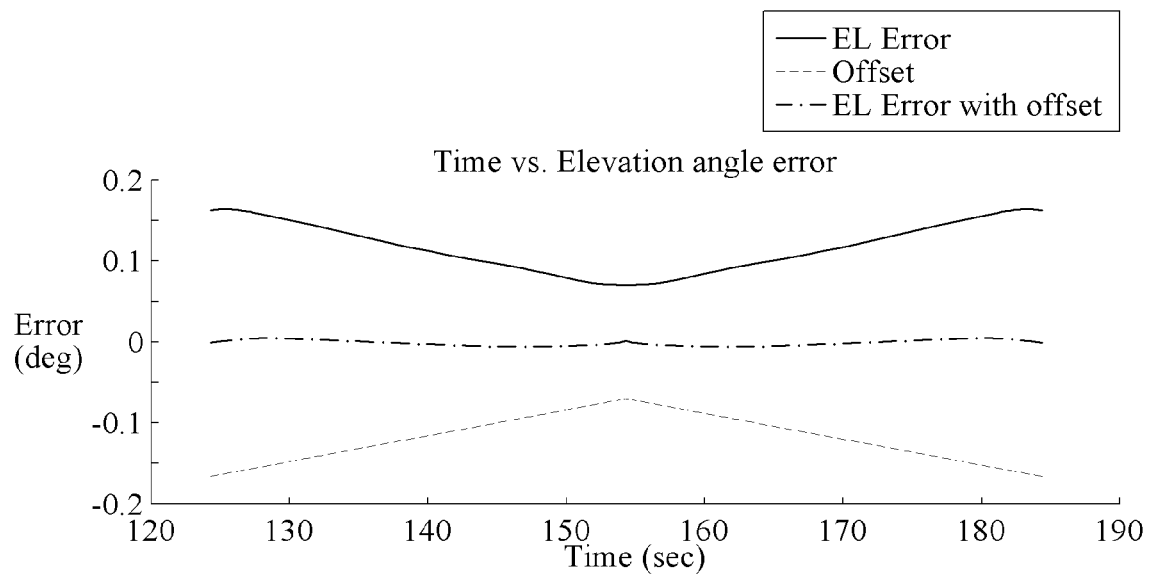
FIG. 8B is a graph representing a time-based error for explaining a calibration of an error in an elevation angle of an antenna calculated through an approximation of a trigonometric function.
Figure 9A:
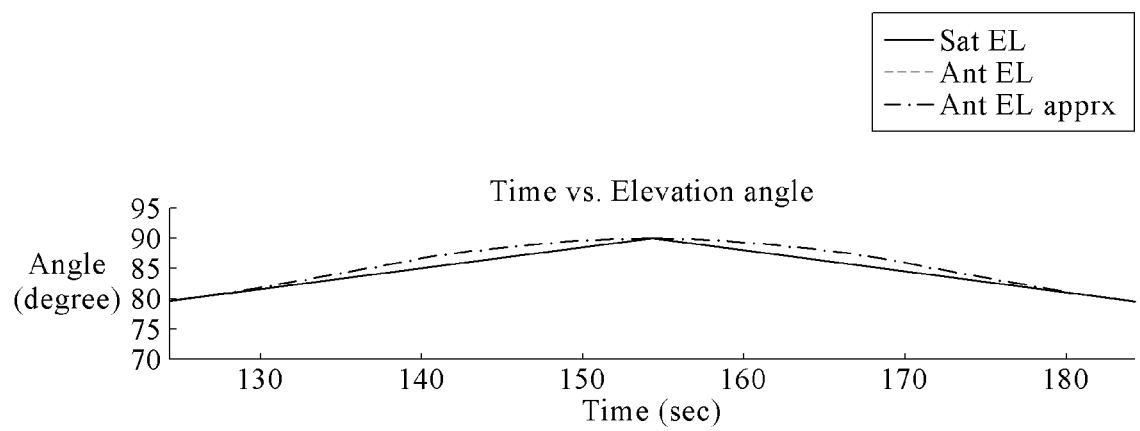
FIG. 9A illustrates a time-based elevation angle of a satellite, an elevation angle of an antenna, and an approximately calculated elevation angle of the antenna when a peak value of an elevation angle of the satellite is 90°.
Figure 9B:
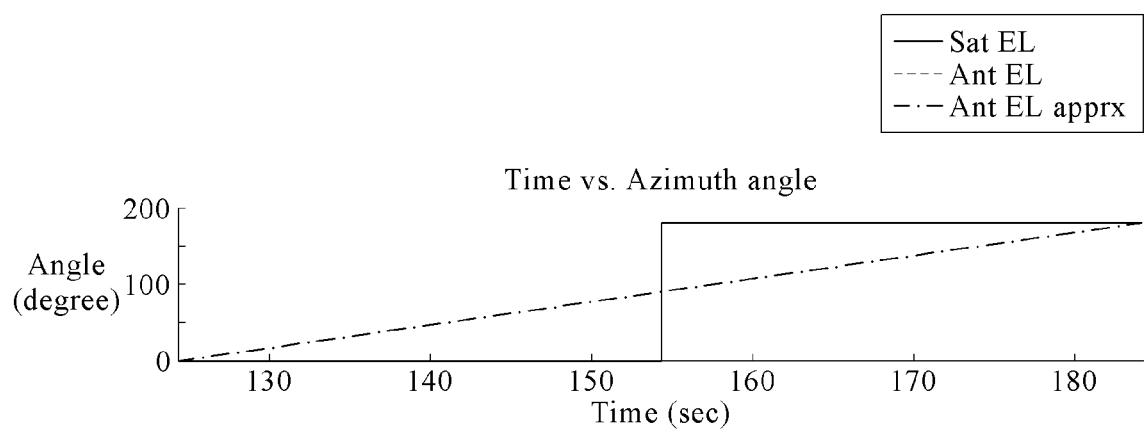
FIG. 9B illustrates a time-based azimuth angle of a satellite, an azimuth angle of an antenna, and an approximately calculated azimuth angle of the antenna when a peak value of an elevation angle of the satellite is 90°.
Figure 9C:
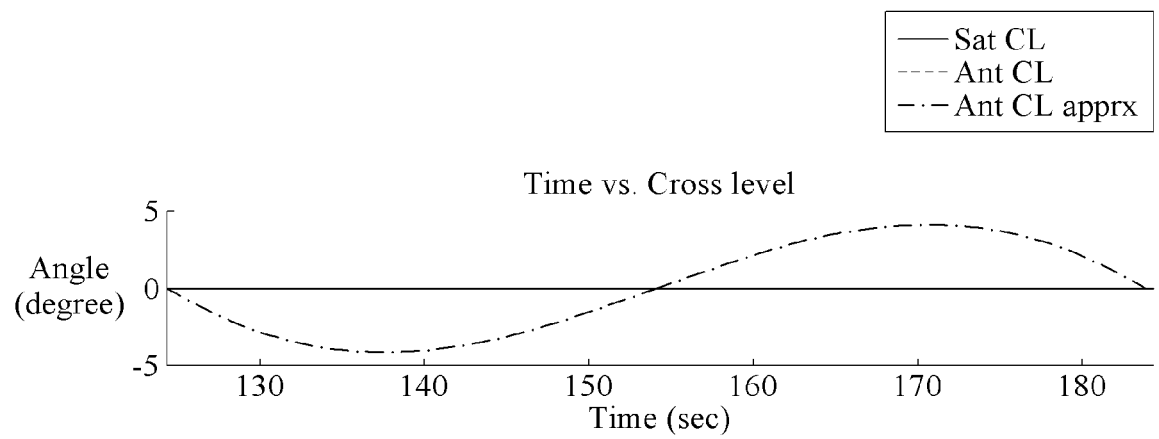
FIG. 9C illustrates a cross level of an antenna and an approximately calculated cross level of the antenna when a peak value of an elevation angle of the satellite is
Figure 9D:
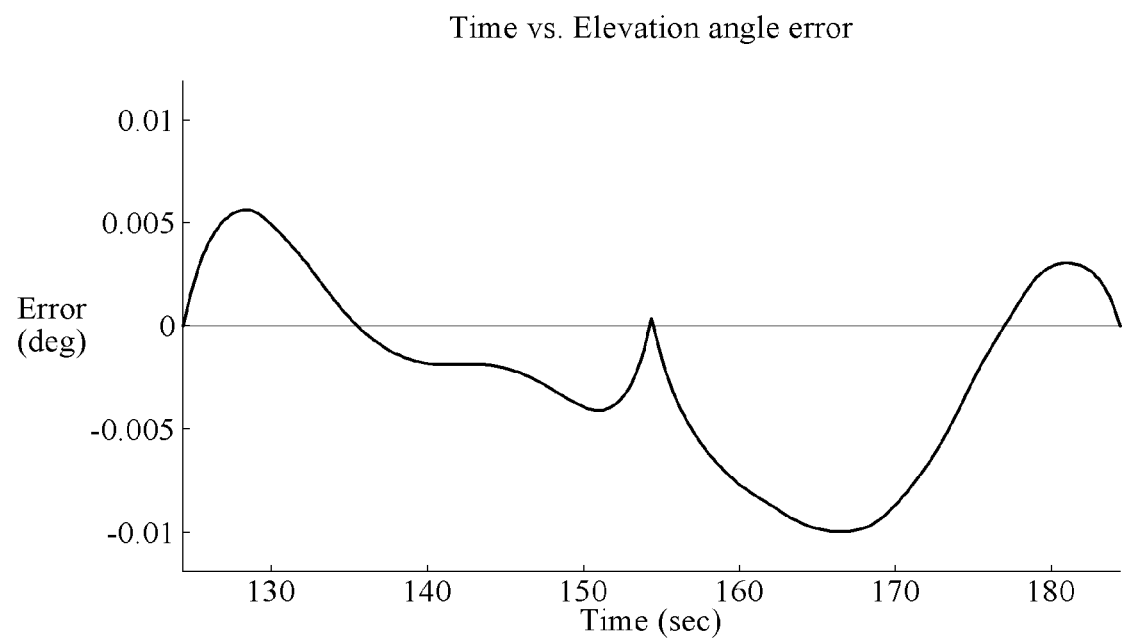
FIG. 9D illustrates a time-based error of an elevation angle of an antenna when a peak value of an elevation angle of the satellite is 90°.
Figure 10A:
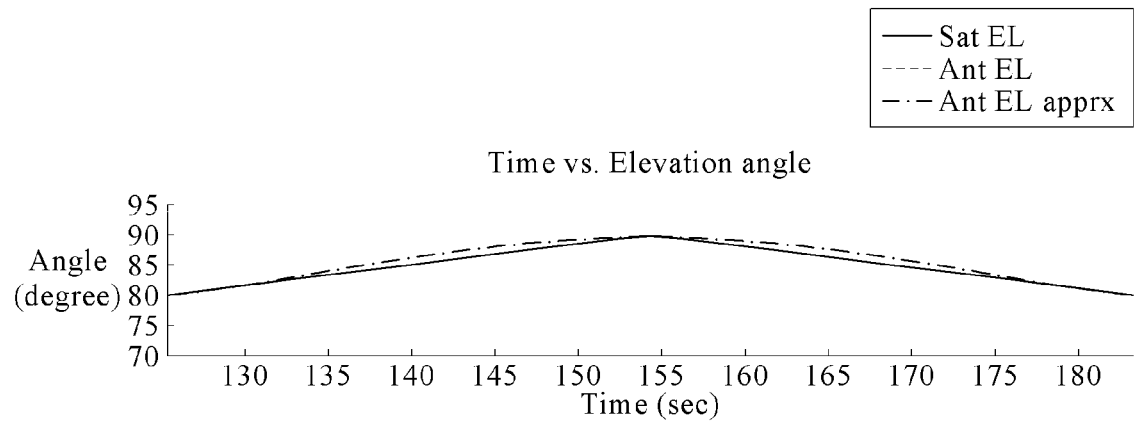
FIG. 10A illustrates a time-based elevation angle of a satellite, an elevation angle of an antenna, and an approximately calculated elevation angle of the antenna when a peak value of an elevation angle of the satellite is 89.5°.
Figure 10B:
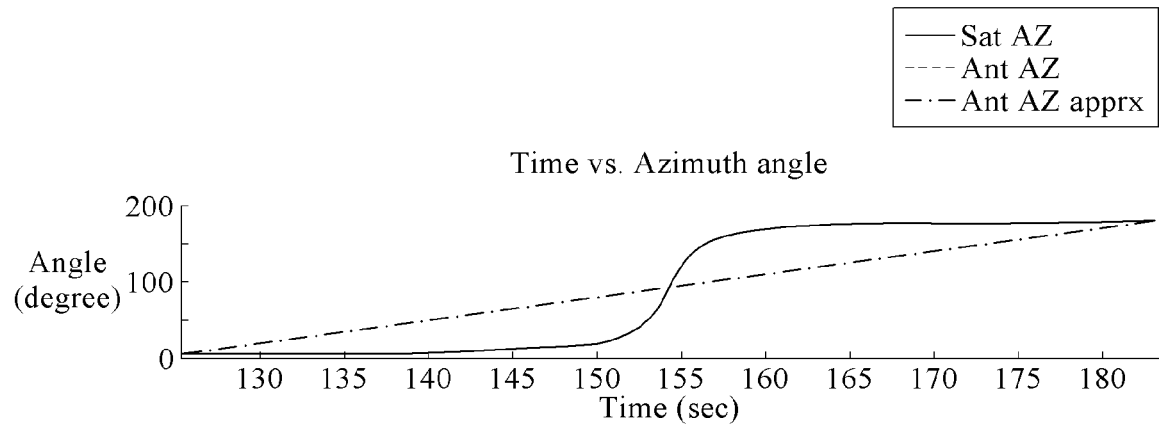
FIG. 10B illustrates a time-based azimuth angle of a satellite, an azimuth angle of an antenna, and an approximately calculated azimuth angle of the antenna when a peak value of an elevation angle of the satellite is 89.5°.
Figure 10C:
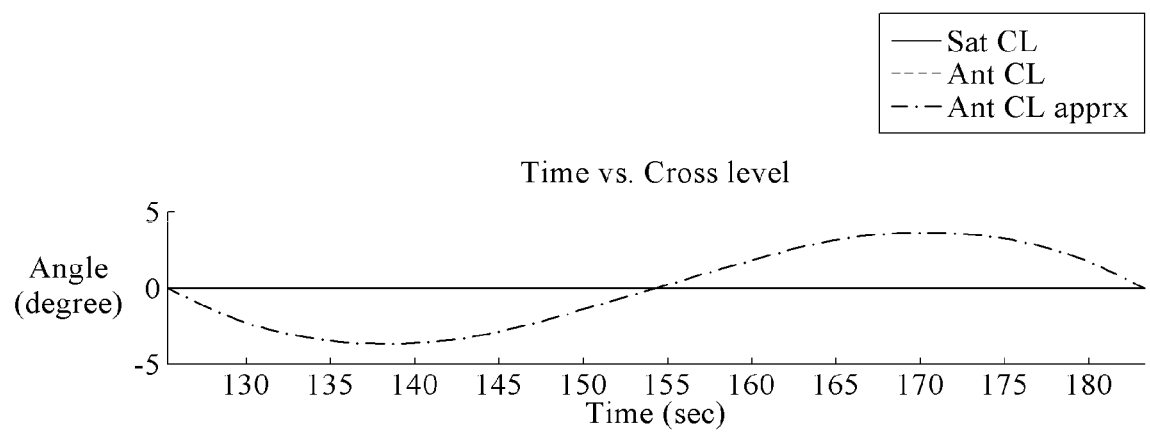
FIG. 10C illustrates a cross level of an antenna and an approximately calculated cross level of the antenna when a peak value of an elevation angle of a satellite is 89.5°.
Figure 10D:
FIG. 10D illustrates a time-based error of an elevation angle of an antenna when a peak value of an elevation angle of a satellite is 89.5°.
Figure 11A:
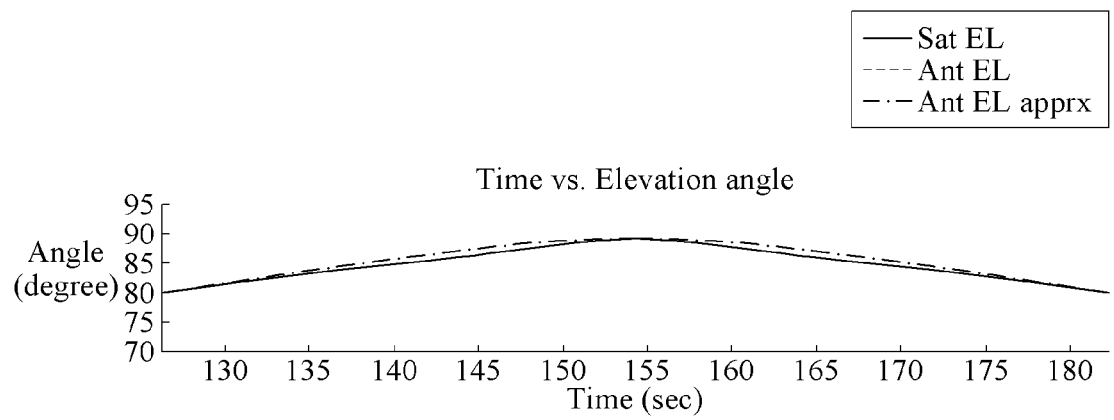
FIG. 11A illustrates a time-based elevation angle of a satellite, an elevation angle of an antenna, and an approximately calculated elevation angle of the antenna when a peak value of an elevation angle of the satellite is 89°.
Figure 11B:
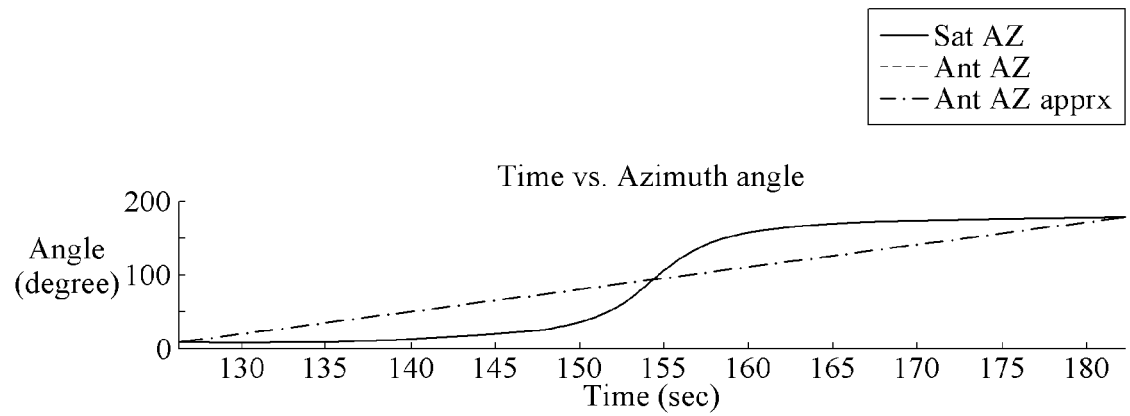
FIG. 11B illustrates a time-based azimuth angle of a satellite, an azimuth angle of an antenna, and an approximately calculated azimuth angle of the antenna when a peak value of an elevation angle of the satellite is 89°.
Figure 11C:
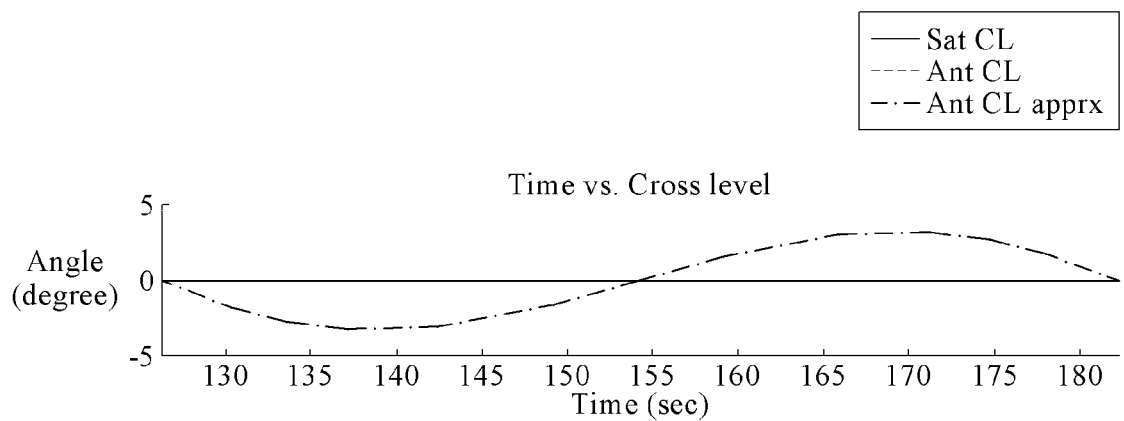
FIG. 11C illustrates a cross level of a satellite, a cross level of an antenna, and an approximately calculated cross level of the antenna when a peak value of an elevation angle of the satellite is 89°.
Figure 11D:
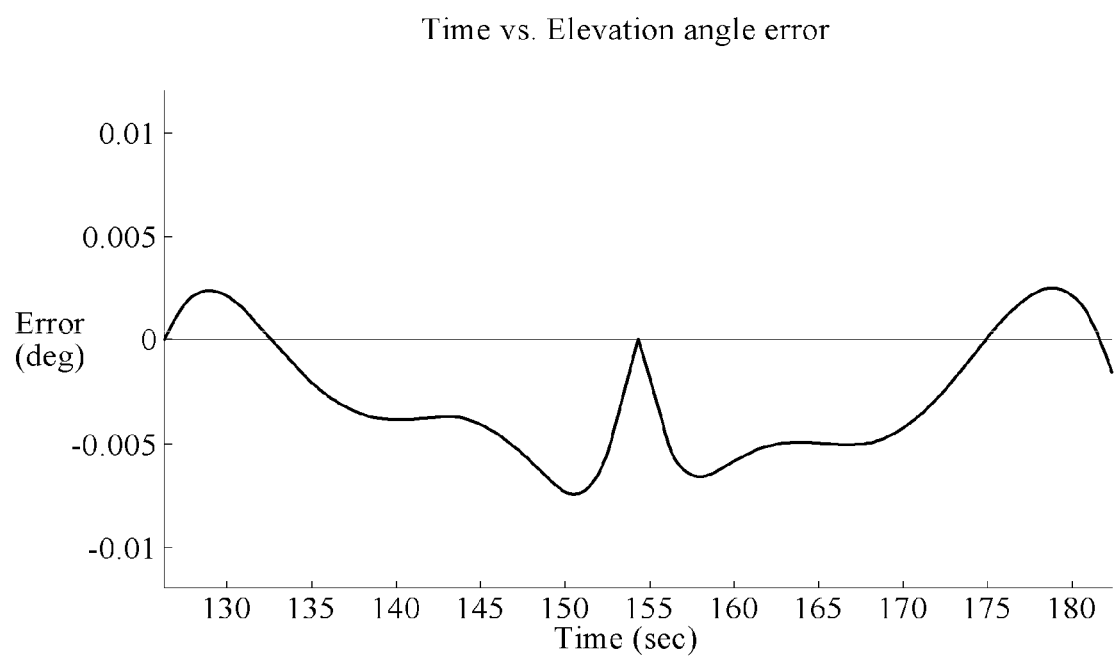
FIG. 11D illustrates a time-based error of an elevation angle of an antenna when a peak value of an elevation angle of a satellite is 89°.
Figure 12A:
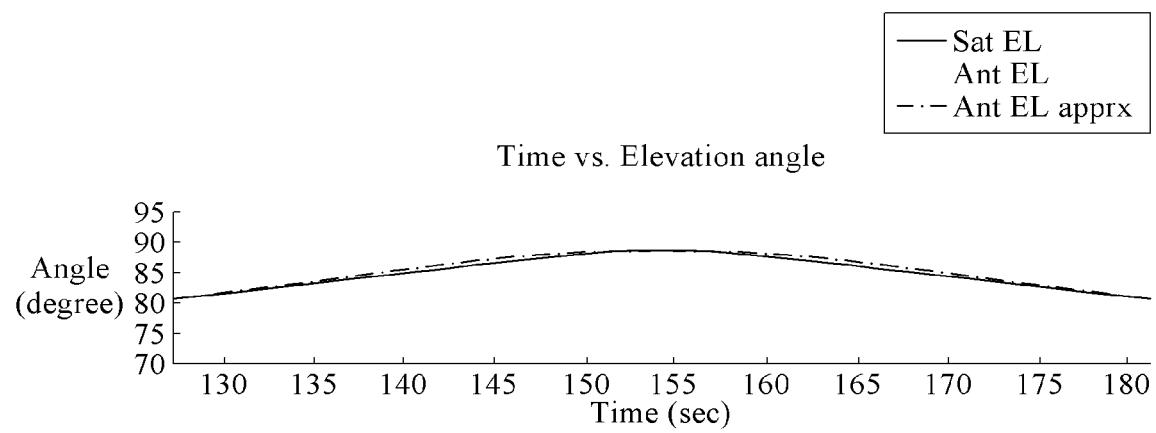
FIG. 12A illustrates a time-based elevation angle of a satellite, an elevation angle of an antenna, and an approximately calculated elevation angle of the antenna when a peak value of an elevation angle of the satellite is 88.5°.
Figure 12B:
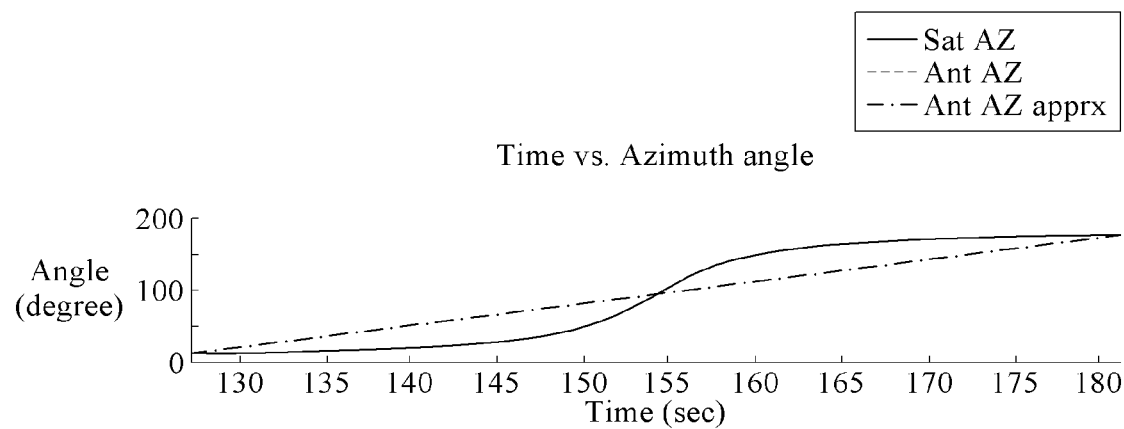
FIG. 12B illustrates a time-based azimuth angle of a satellite, an azimuth angle of an antenna, and an approximately calculated azimuth angle of the antenna when a peak value of an elevation angle of the satellite is 88.5°.
Figure 12C:
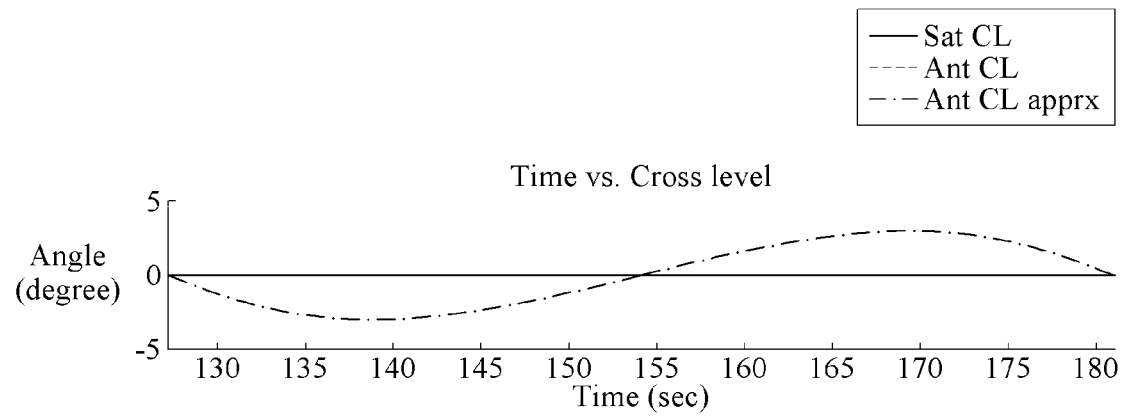
FIG. 12C illustrates a cross level of a satellite, a cross level of an antenna, and an approximately calculated cross level of the antenna when a peak value of an elevation angle of the satellite is 88.5°.
Figure 12D:
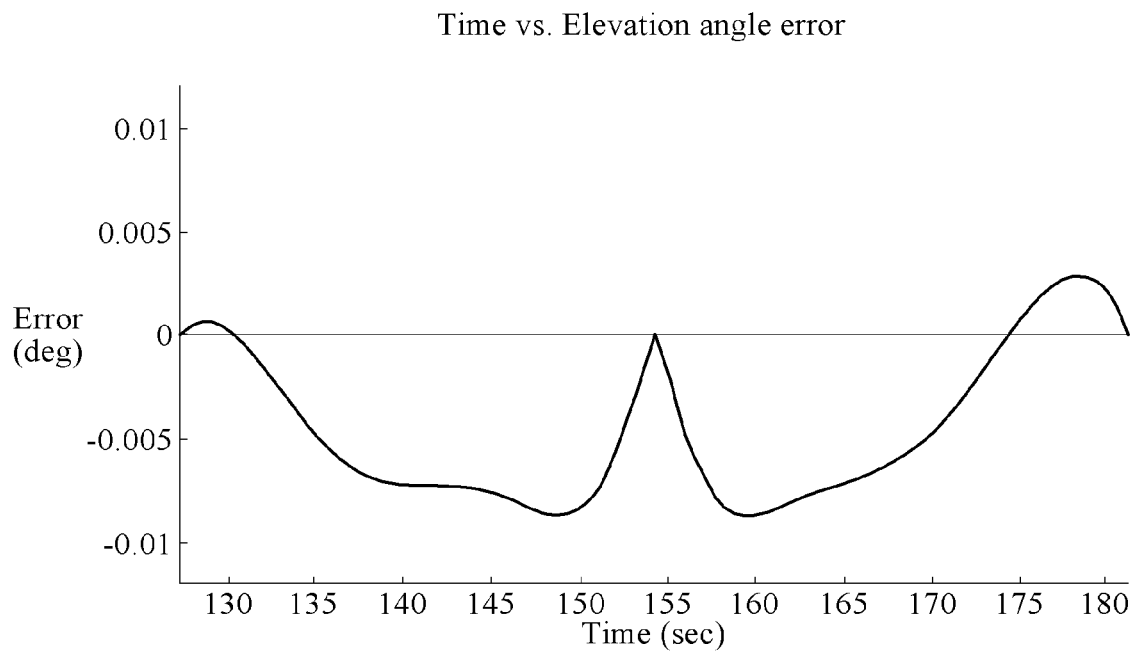
FIG. 12D illustrates a time-based error of an elevation angle of an antenna when a peak value of an elevation angle of a satellite is 88.5°.
Figure 13A:
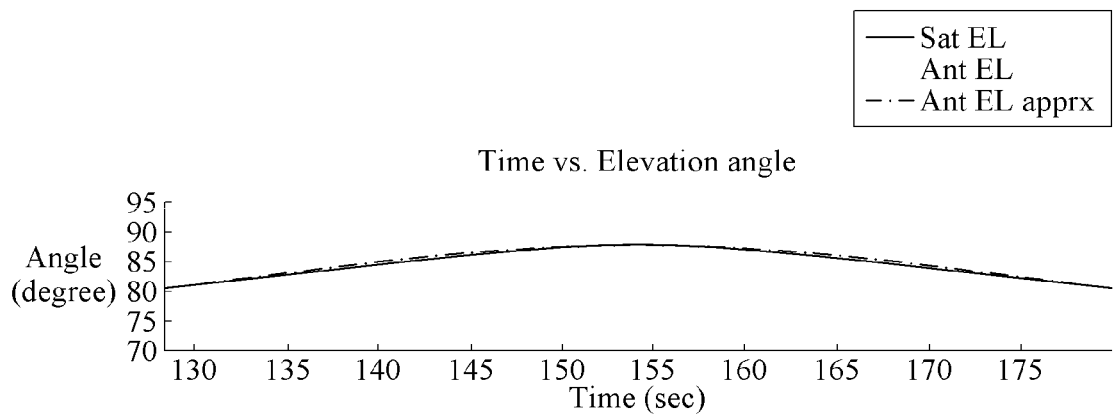
FIG. 13A illustrates a time-based elevation angle of a satellite, an elevation angle of an antenna, and an approximately calculated elevation angle of the antenna when a peak value of an elevation angle of the satellite is 88°.
Figure 13B:
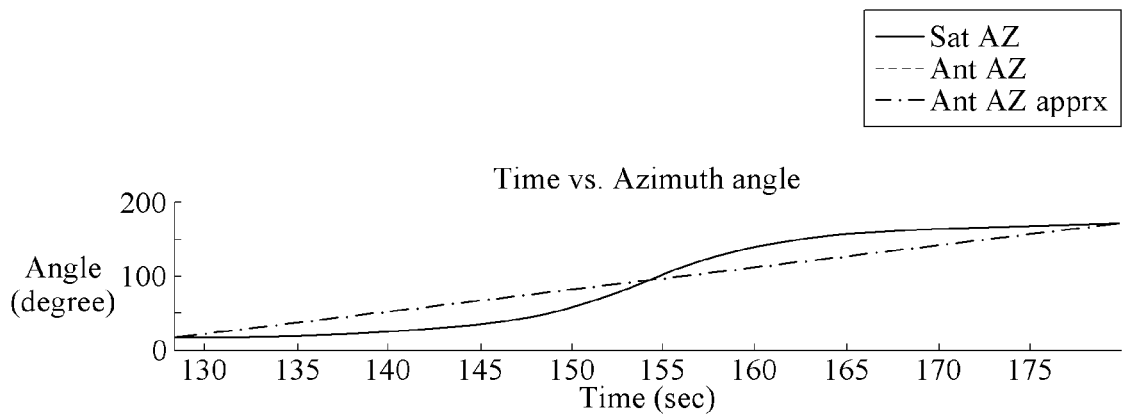
FIG. 13B illustrates a time-based azimuth angle of a satellite, an azimuth angle of an antenna, and an approximately calculated azimuth angle of the antenna when a peak value of an elevation angle of the satellite is 88°.
Figure 13C:
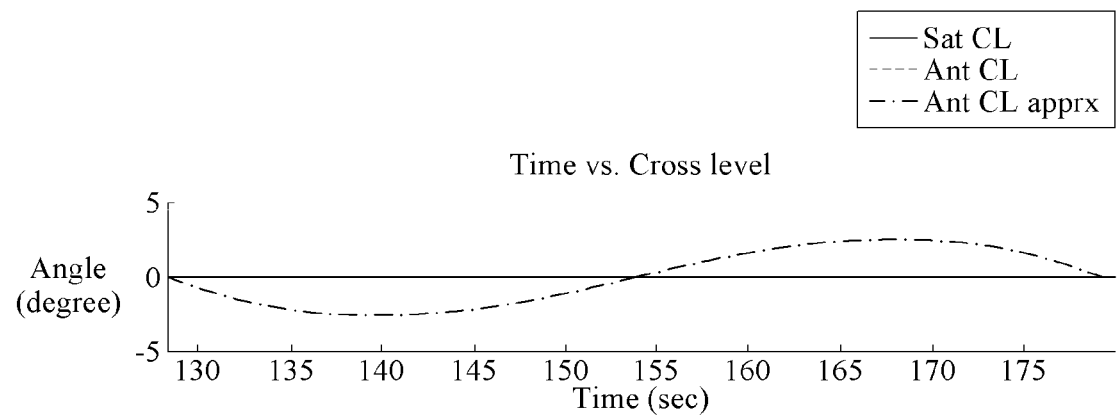
FIG. 13C illustrates a cross level of a satellite, a cross level of an antenna, and an approximately calculated cross level of the antenna when a peak value of an elevation angle of the satellite is 88°.
Figure 13D:
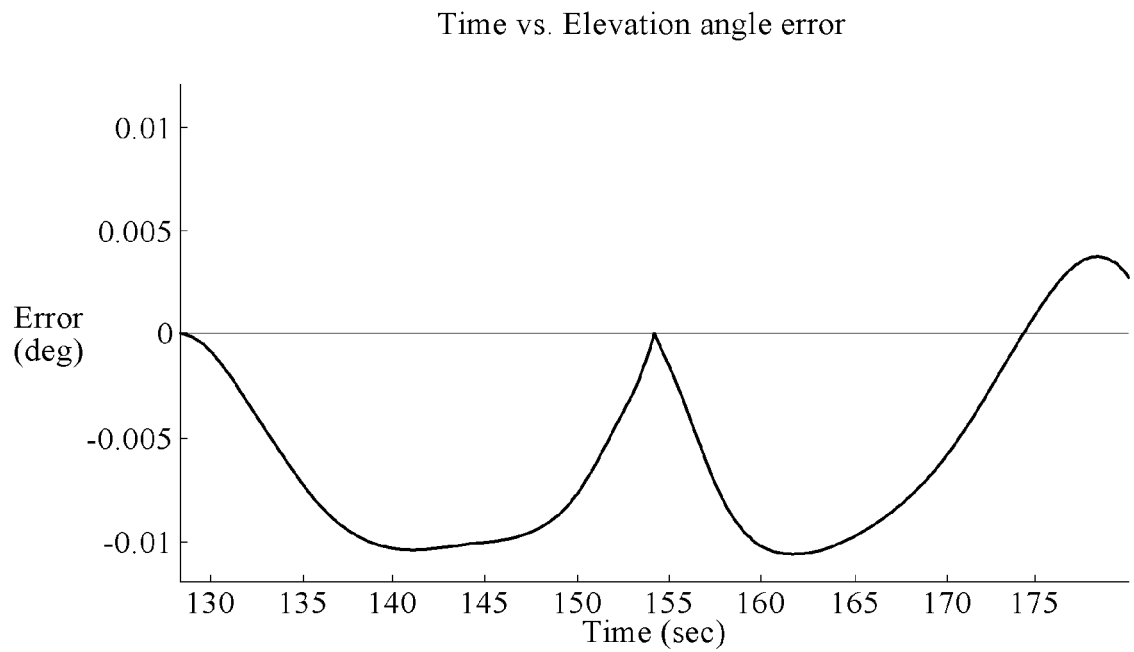
FIG. 13D illustrates a time-based error of an elevation angle of an antenna when a peak value of an elevation angle of a satellite is 88°.

FIG. 8A is a graph representing an elevation angle of an antenna on a time-by-time basis to explain an error in an approximately calculated elevation angle of the antenna, and FIG. 8B is a graph representing a time-based error for explaining a calibration of error in an elevation angle of an antenna calculated through an approximation of a trigonometric function.

FIGS. 9A, 10A, 11A, 12A, and 13A illustrate examples of a time-based elevation angle of a satellite, an elevation angle of an antenna, and an approximately calculated elevation angle of the antenna obtained when a peak value of an elevation angle of the satellite is 90°, 89.5°, 89°, 88.5° and 88°.

FIGS. 9B, 10B, 11B, 12B, and 13B illustrate examples of a time-based azimuth angle of a satellite, an azimuth angle of an antenna, and an approximately calculated azimuth angle of the antenna obtained when a peak value of an elevation angle of the satellite is 90°, 89.5°, 89°, 88.5° and 88°.

FIGS. 9C, 10C, 11C, 12C, and 13C illustrate examples of a cross level of an antenna and an approximately calculated cross level of the antenna obtained when a peak value of an elevation angle of the satellite is 90°, 89.5°, 89°, 88.5° and 88°. In this instance, the cross level of the satellite (Sat CL) may indicate a stationary state at a mechanical center and thus, may be 0° irrespective of time.

The controller 200 may determine a trajectory of the antenna 50 through an approximation of a trigonometric function. The controller 200 may calculate at least one of the elevation angle, the azimuth angle, and the cross level of the antenna 50 through an approximation of a trigonometric function. The antenna 50 may reduce an amount of calculation through the approximation, thereby reducing a load of a processor.

The controller 200 may determine the elevation angle of the antenna 50 and the cross level of the antenna 50 using at least one of a Bhaskara approximation and a Taylor series approximation of trigonometric function values based on the azimuth angle of the satellite 30, the elevation angle of the satellite 30, the azimuth angle of the antenna 50, and an oblique angle of the antenna 50.

For example, the controller 200 may approximately calculate a trigonometric function using a Bhaskara approximation function as shown in Equations 23 and 24.

$$\sin x \approx \frac{4x(180-x)}{40500 - x(180-x)} \text{ where } 0° \le x \le 180°$$ [Equation 23]

$$\cos x \approx \frac{180^2 - 4x^2}{180^2 + x^2} \text{ where } -90° \le x \le 90°$$ [Equation 24]

Also, the controller 200 may approximately calculate an inverse function of the trigonometric function using a Taylor series approximation function as showy in Equations 25 and 26.

$$\cos^{-1} x = \frac{\pi}{2} - \sum_{n=0}^{\infty} \frac{(2n-1)!!}{(2n)!!} \frac{x^{2n+1}}{2n+1} \qquad \text{[Equation 25]}$$

$$\tan^{-1} x = \sum_{k=0}^{\infty} \frac{(-1)^k x^{2k+1}}{2k+1} \qquad \text{[Equation 26]}$$

Here, since a use range of Taylor series is outside a range of error amplification, the controller 200 may calculate an approximate value using a relatively low order Taylor series.

As illustrated in FIG. 8A, when the Bhaskara approximation function is used, an error may be accumulated in calculating the trigonometric function even if a maximum error value is relatively small. For example, in the keyhole situation, a maximum error of 0.164° may be generated in the calculation of the elevation angle of the antenna 50.

In terms of the cross level of the antenna 50, an error may be relatively small. For example, the cross level of the antenna 50 may have a maximum error of 0.0596°.

The controller 200 may calculate an error between an actual function and an approximated function. The controller 200 may use an offset in a form of a first order function to calibrate the error between the actual function and the approximated function. The controller 200 may calibrate an error due to at least one of the Bhaskara approximation and the Taylor series approximation by using an offset based on the peak value of the elevation angle of the satellite 30, an initial value of the elevation angle of the satellite 30, a peak value of the approximated elevation angle of the antenna 50, and an initial value of the elevation angle of the antenna 50.

Here, the initial values of the elevation angles of the antenna 50 and the satellite 30 may indicate elevation angles of a point at which the trajectory of the antenna 50 starts to be reconstructed. For example, the initial value of the elevation angle may indicate an elevation angle of the satellite 30 corresponding to a start point of a threshold trajectory of the antenna 50 determined by the controller 200. Likewise, the initial value of the elevation angle of the antenna 50 may indicate an elevation angle of the antenna 50 corresponding to the start point of the threshold trajectory of the antenna 50 determined by the controller 200.

For example, the controller 200 may calibrate the aforementioned error using Equation 27.

$$f_{offset}(t) = -\frac{\varphi_P - \beta_P - \varphi_0 + \beta_0}{t_P - t_0}|t - t_P| + \varphi_P - \beta_P \qquad \text{[Equation 27]}$$

In Equation 27, $\beta_P$ denotes a peak value of the elevation angle of the satellite 30 included in the ephemeris information, $\beta_0$ denotes an initial value of the elevation angle of the satellite 30, and $\varphi_P$ denotes a peak value of the approximated elevation angle of the antenna 50.

denotes an initial value of the elevation angle of the antenna 50, $t_P$ denotes a time in which the elevation angle of the satellite 30 has the peak value, and $t_0$ denotes an initial time at which a determination of a trajectory starts. t denotes a current FIGS. 9A through 13D illustrate trajectory of the antenna 50 based on a change in a peak value of the elevation angle of the satellite 30, and an error between a value calculated according to Equation 22 and a approximately calculated value obtained by using Equations 23 through 26.

Figure 14:
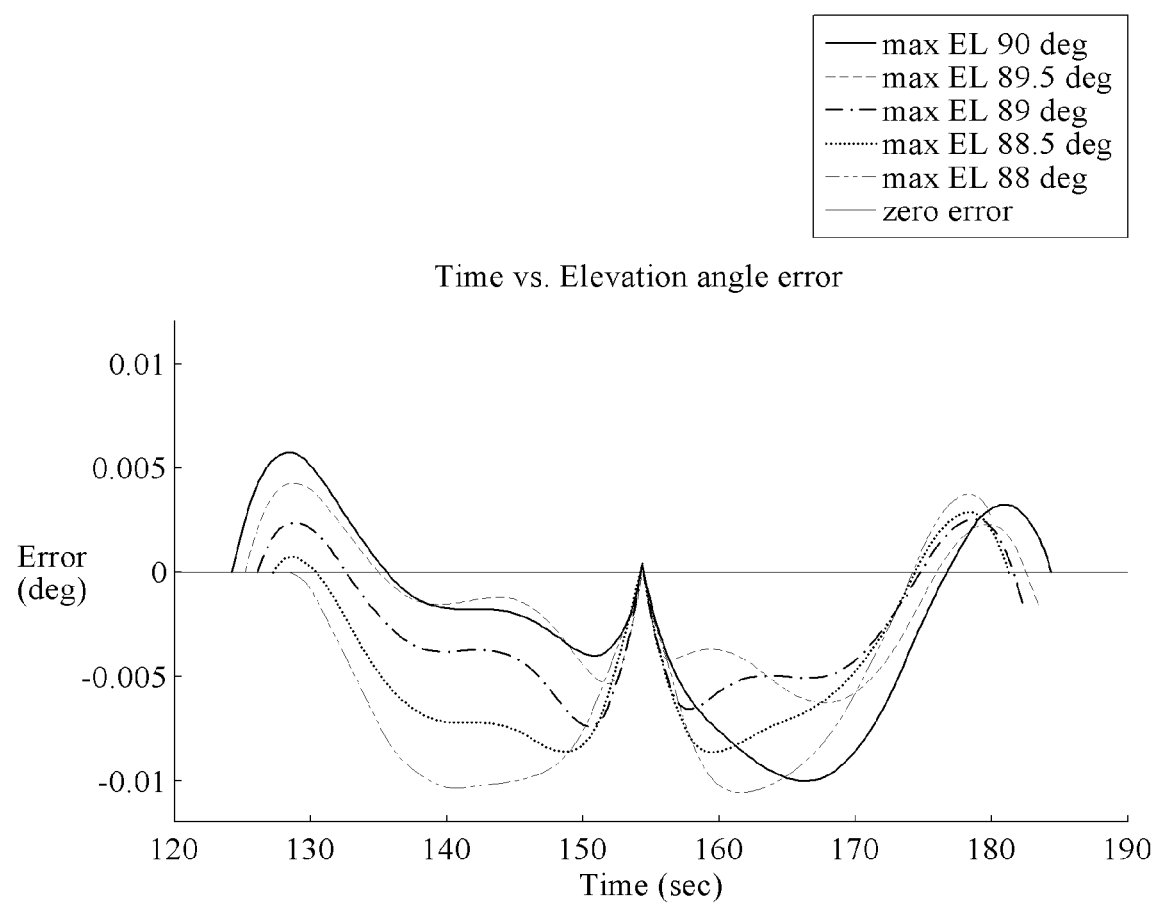
FIG. 14 illustrates a time-based error of an elevation angle of an antenna for a peak value of elevation angles of various satellites.

An error due to a change in the peak value of the elevation angle of the satellite 30 may be represented as illustrated in FIG. 14.

Figure 15:
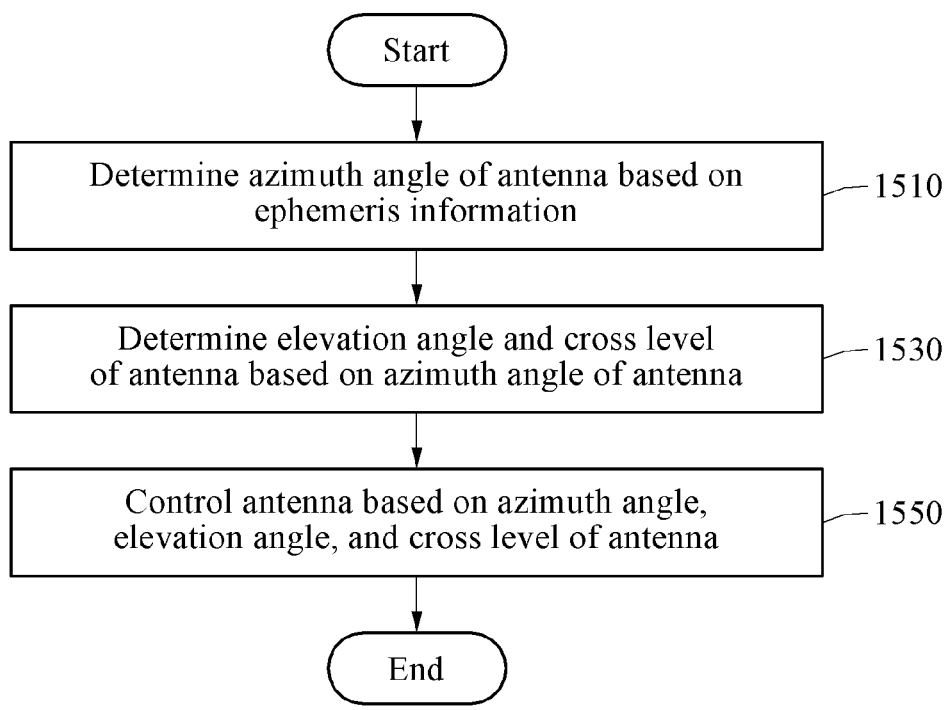
FIG. 15 is a flowchart illustrating operations of the antenna control apparatus of FIG. 1A.

FIG. 15 is a flowchart illustrating operations of the antenna control apparatus of FIG. 1A.

Referring to FIG. 15, in operation 1510, the controller 200 may determine an azimuth angle of the antenna 50 based on ephemeris information of a satellite. The ephemeris information may include a time-based azimuth angle of the satellite 30, a time-based elevation angle of the satellite 30, an azimuth angle obtained when an elevation angle of the satellite 30 has a peak value, the peak value of the elevation angle of the satellite 30, and a time in which the elevation angle of the satellite 30 has the peak value.

The controller 200 may compare an angular velocity of an azimuth angle of the satellite 30 to a threshold angular velocity. The controller 200 may determine a trajectory of the azimuth angle of the antenna 50 based on a comparison result. The controller 200 may determine the trajectory such that the angular velocity of the azimuth angle of the antenna is less than or equal to the threshold angular velocity.

When the angular velocity of the azimuth angle of the satellite 30 is greater than or equal to the threshold angular velocity, the controller 200 may determine the trajectory of the azimuth angle of the antenna 50 to be a threshold trajectory.

When the angular velocity of the azimuth angle of the antenna 50 is less than the threshold angular velocity, the controller 200 may determine the trajectory of the azimuth angle of the antenna 50 to be a trajectory based on the ephemeris information. Specifically, the controller 200 may determine a two-axis trajectory including an azimuth-angle axis of the antenna 50 and an elevation-angle axis of the antenna 50 to be the trajectory of the antenna 50.

In operation 1530, the controller 200 may determine an elevation angle and a cross level of the antenna 50 based on the azimuth angle of the antenna 50.

The controller 200 may determine the elevation angle of the antenna 50 based on the azimuth angle of the satellite 30, the elevation angle of the satellite 30, the azimuth angle of the antenna 50, and an oblique angle of the antenna 50.

The controller 200 may determine the cross level of the antenna 50 based on the azimuth angle of the satellite 30, the elevation angle of the satellite 30, the azimuth angle of the antenna 50, and the oblique angle of the antenna 50.

The controller 200 may determine the elevation angle and the cross level of the antenna 50 by using at least one of a Bhaskara approximation and a Taylor series approximation of trigonometric function values based on the azimuth angle of the satellite 30, the elevation angle of the satellite 30, the azimuth angle of the antenna 50, and the oblique angle of the antenna 50.

The controller 200 may calibrate an error due to at least one of the Bhaskara approximation and the Taylor series approximation. Specifically, the controller 200 may calibrate the error by using an offset based on the peak value of the elevation angle of the satellite 30, an initial value of the elevation angle of the satellite 30, a peak value of an approximated elevation angle of the antenna 50, and an initial value of the elevation angle of the antenna 50.

In operation 1550, the controller 200 may control the antenna based on the azimuth angle of the antenna 50 and the elevation angle and the cross level of the antenna 50.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling an antenna, the method comprising:
   determining an azimuth angle of an antenna based on ephemeris information of a satellite;
   determining an elevation angle and a cross level of the antenna based on the azimuth angle; and
   controlling the antenna based on the azimuth angle, the elevation angle, and the cross level;
   wherein the determining of the azimuth angle comprises:
      comparing an angular velocity of an azimuth angle of the satellite to a threshold angular velocity; and
      determining a trajectory of the azimuth angle of the antenna based on a comparison result.

2. The method of claim 1, wherein the ephemeris information includes at least one of a time-based azimuth angle of the satellite, a time-based elevation angle of the satellite, an azimuth angle obtained when the elevation angle of the satellite has a peak value, the peak value of the elevation angle of the satellite, and a time in which the elevation angle of the satellite has the peak value.

3. The method of claim 1, wherein the determining of the trajectory of the azimuth angle of the antenna comprises:
   determining the trajectory such that an angular velocity of the azimuth angle of the antenna is less than or equal to the threshold angular velocity.

4. The method of claim 1, wherein the determining of the trajectory comprises:
   determining the trajectory of the azimuth angle of the antenna to be a threshold trajectory when the angular velocity of the azimuth angle of the satellite is greater than or equal to the threshold angular velocity; or
   determining the trajectory of the azimuth angle of the antenna to be a trajectory based on the ephemeris information when the angular velocity of the azimuth angle is less than the threshold angular velocity.

5. The method of claim 4, wherein the determining the trajectory of the azimuth angle of the antenna to be a trajectory based on the ephemeris information comprises:
   determining the trajectory to be a two-axis trajectory including an azimuth angle axis of the antenna and an elevation angle axis of the antenna.

6. The method of claim 1, wherein the determining of the elevation angle and the cross level of the antenna comprises:
   determining the elevation angle of the antenna based on an azimuth angle of the satellite, an elevation angle of the satellite, the azimuth angle of the antenna, and an oblique angle of the antenna; and
   determining the cross level of the antenna based on the azimuth angle of the satellite, the elevation angle of the satellite, the azimuth angle of the antenna, and the oblique angle of the antenna.

7. The method of claim 1, wherein the determining of the elevation angle and the cross level of the antenna comprises:
   determining the elevation angle and the cross level of the antenna using at least one of a Bhaskara approximation and a Taylor series approximation of trigonometric function values based on an azimuth angle of the satellite, an elevation angle of the satellite, the azimuth angle of the antenna, and an oblique angle of the antenna.

8. The method of claim 7, wherein the determining of the elevation angle and the cross level of the antenna further comprises:
   calibrating an error due to at least one of the Bhaskara approximation and the Taylor series approximation.

9. The method of claim 8, wherein the calibrating comprises:
   calibrating the error using an offset based on a peak value of an elevation angle of the satellite, an initial value of the elevation angle of the satellite, a peak value of an approximated elevation angle of the antenna, and an initial value of the elevation angle of the antenna.

10. The method of claim 1, further comprising selecting the threshold angular velocity to limit a load generated in a motor of a driver rotating an azimuth-angle axis of the antenna to a maximum load when the elevation angle approaches a predetermined maximum elevation angle between 80 and 90 degrees.

11. An apparatus for controlling an antenna, the apparatus comprising:
   a controller configured to determine an azimuth angle of an antenna based on ephemeris information of a satellite, determine an elevation angle and a cross level of the antenna based on the azimuth angle, and control the antenna based on the azimuth angle, the elevation angle, and the cross level;

wherein the controller is configured to compare an angular velocity of an azimuth angle of the satellite to a threshold angular velocity and determine a trajectory of the azimuth angle of the antenna based on a comparison result.

12. The apparatus of claim 11, wherein the ephemeris information includes at least one of a time-based azimuth angle of the satellite, a time-based elevation angle of the satellite, an azimuth angle obtained when the elevation angle of the satellite has a peak value, the peak value of the elevation angle of the satellite, and a time in which the elevation angle of the satellite has the peak value.

13. The apparatus of claim 11, wherein the controller is configured to determine the trajectory such that an angular velocity of the azimuth angle of the antenna is less than or equal to the threshold angular velocity.

14. The apparatus of claim 11, wherein the controller is configured to determine the trajectory of the azimuth angle of the antenna to be a threshold trajectory when the angular velocity of the azimuth angle of the satellite is greater than or equal to the threshold angular velocity, or determine the trajectory of the azimuth angle of the antenna to be a trajectory based on the ephemeris information when the angular velocity of the azimuth angle is less than the threshold angular velocity.

15. The apparatus of claim 14, wherein the controller is configured to determine the trajectory to be a two-axis trajectory including an azimuth angle axis of the antenna and an elevation angle axis of the antenna.

16. The apparatus of claim 11, wherein the controller is configured to determine the elevation angle of the antenna based on an azimuth angle of the satellite, an elevation angle of the satellite, the azimuth angle of the antenna, and an oblique angle of the antenna, and determine the cross level of the antenna based on the azimuth angle of the satellite, the elevation angle of the satellite, the azimuth angle of the antenna, and the oblique angle of the antenna.

17. The apparatus of claim 11, wherein the controller is configured to determine the elevation angle and the cross level of the antenna using at least one of a Bhaskara approximation and a Taylor series approximation of trigonometric function values based on an azimuth angle of the satellite, an elevation angle of the satellite, the azimuth angle of the antenna, and an oblique angle of the antenna.

18. The apparatus of claim 17, wherein the controller is configured to calibrate an error due to at least one of the Bhaskara approximation and the Taylor series approximation.

19. The apparatus of claim 18, wherein the controller is configured to calibrate the error using an offset based on a peak value of an elevation angle of the satellite, an initial value of the elevation angle of the satellite, a peak value of an approximated elevation angle of the antenna, and an initial value of the elevation angle of the antenna.

20. The apparatus of claim 11, wherein the controller is configured to select the threshold angular velocity to limit a load generated in a motor of a driver rotating an azimuth-angle axis of the antenna to a maximum load when the elevation angle approaches a predetermined maximum elevation angle between 80 and 90 degrees.

* * * * *